(12) United States Patent
Kato et al.

(10) Patent No.: US 7,066,560 B2
(45) Date of Patent: Jun. 27, 2006

(54) VEHICLE MOTION CONTROL DEVICE

(75) Inventors: Toshihisa Kato, Handa (JP); Junya Nagaya, Kariya (JP); Shinji Tsugawa, Obu (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/895,117

(22) Filed: Jul. 21, 2004

(65) Prior Publication Data

US 2005/0017578 A1 Jan. 27, 2005

(30) Foreign Application Priority Data

Jul. 23, 2003 (JP) ............................. 2003-278386

(51) Int. Cl.
*B60T 8/58* (2006.01)
(52) U.S. Cl. .................. 303/140; 303/146; 701/72
(58) Field of Classification Search ................ 701/70, 701/72; 303/139, 140, 146, 147
See application file for complete search history.

(56) References Cited

U.S. PATENT DOCUMENTS

| 5,869,943 | A | 2/1999 | Nakashima et al. |
| 6,086,168 | A | 7/2000 | Rump |
| 6,910,746 | B1* | 6/2005 | Kato et al. .................. 303/140 |
| 2004/0193352 | A1* | 9/2004 | Ito et al. .................. 701/70 |
| 2005/0012392 | A1* | 1/2005 | Kato et al. .................. 303/191 |
| 2005/0027426 | A1* | 2/2005 | Kato et al. .................. 701/70 |
| 2005/0046274 | A1* | 3/2005 | Banno et al. ................ 303/147 |

FOREIGN PATENT DOCUMENTS

| JP | 10-81215 | 3/1998 |
| JP | 10-119743 | 5/1998 |

* cited by examiner

*Primary Examiner*—Christopher P. Schwartz
(74) *Attorney, Agent, or Firm*—Buchanan Ingersoll PC

(57) ABSTRACT

This device sets, upon executing only a roll-over preventing control, roll-over preventing braking force exerted on a front wheel at the outer side of the turning direction based upon a table value obtained through an absolute value |Gy| of an actual lateral acceleration and a predetermined table, and sets, upon executing only an US restraining control, US restraining braking force exerted on a rear wheel at the inner side of the turning direction based upon a table value obtained through an absolute value |ΔGy| of a lateral acceleration deviation, that is a deviation between a target lateral acceleration and the actual lateral acceleration, and a predetermined table. In case where the roll-over preventing control and the US restraining control are simultaneously executed, the roll-over preventing braking force is similarly set and the US restraining braking force is set based upon a value obtained by multiplying the value based upon the table value by a predetermined US restraining braking force damping factor α ($0 \leq \alpha \leq 1$), thereby giving priority to the roll-over preventing control.

7 Claims, 9 Drawing Sheets

(a) Only US restraining control (b) US restraining control + Roll-over preventing control → : Direction of braking force
⟶ : Turning direction of vehicle (a) Only US restraining control Lateral acceleration deviation Lateral acceleration → : Direction of braking force
⟶ : Turning direction of vehicle Lateral acceleration deviation (b) US restraining control + Roll-over preventing control

VEHICLE MOTION CONTROL DEVICE

BACKGROUND OF THE INVENTION

1. Field of the Invention

The present invention relates to a vehicle motion control device for controlling a motion of a vehicle by controlling braking force exerted on each wheel of the vehicle.

2. Description of the Prior Arts

There has conventionally been a demand for controlling a vehicle motion so as to prevent the turning state of the vehicle from being unstable due to the occurrence of an excessive roll angle on the vehicle, when the vehicle is in the turning state. This roll angle depends generally upon the magnitude of an actual lateral acceleration (accordingly, the centrifugal force exerted on the vehicle) that is a component of an acceleration actually exerted on the vehicle in the side-to-side direction of the vehicle body, whereby the centrifugal force exerted on the vehicle is decreased by forcibly generating a yawing moment in the direction opposite to the turning direction of the vehicle or by decelerating the vehicle.

Further, it is also conventionally required to control a vehicle motion so as to prevent that a turning state from being unstable since the turning state of the vehicle is brought into an excessive understeer (hereinafter referred to as "US") state or excessive oversteer (hereinafter referred to as "OS") state. This understeer state can be eliminated by forcibly generating a yawing moment on the vehicle in the direction same as the turning direction. On the other hand, the oversteer state can be eliminated by forcibly generating a yawing moment on the vehicle in the direction opposite to the turning direction.

From the above, a vehicle motion control device disclosed in the patent document 1 executes a roll-over preventing control for exerting roll-over preventing braking force, that is for generating a yawing moment on the vehicle in the direction opposite to the turning direction, on the front wheel at the outer side of the turning direction, when the vehicle is in the turning state and a degree of a tendency that an excessive roll angle occurs indicated by a predetermined excessive roll angle occurrence tendency index value (for example, an absolute value of the actual lateral acceleration or the like) exceeds a predetermined degree (for example, when the absolute value of the actual lateral acceleration exceeds a predetermined actual lateral acceleration threshold value).

[Patent Document 1]
Japanese Unexamined Patent Application No. HEI10-119743

Further, this device executes an understeer restraining control for exerting understeer restraining braking force, that is for generating a yawing moment on a vehicle in a direction same as the turning direction, on a rear wheel at the inner side of the turning direction, when a degree of understeer tendency indicated by a predetermined OS-US tendency index value (for example, a deviation between a target lateral acceleration and an actual lateral acceleration (lateral acceleration deviation)) exceeds a predetermined degree (for example, when the lateral acceleration deviation exceeds a positive lateral acceleration deviation threshold value), and executes an oversteer restraining control for exerting oversteer restraining braking force, that is for generating a yawing moment on a vehicle in a direction opposite to the turning direction, on a front wheel at the outer side of the turning direction, when a degree of oversteer tendency indicated by the predetermined OS-US tendency index value exceeds a predetermined degree (for example, when the lateral acceleration deviation falls below a negative lateral acceleration deviation threshold value). This device can simultaneously execute the above-mentioned each control.

Here, the understeer restraining control and the oversteer restraining control are executed based upon the same index value (the above-mentioned OS-US tendency index value), and there is a relationship that the OS-US tendency index value upon executing the understeer restraining control and the OS-US tendency index value upon executing the oversteer restraining control are not overlapped with each other. Therefore, the understeer restraining control and the oversteer restraining control are not simultaneously executed. On the other hand, the roll-over preventing control is executed based upon the excessive roll angle occurrence tendency index value that is different from the OS-US tendency index value, so that the roll-over preventing control and the understeer restraining control can be simultaneously executed.

Meanwhile, the roll-over preventing control is a control for generating a yawing moment on the vehicle in the direction opposite to the turning direction, while the understeer restraining control is a control for generating a yawing moment on the vehicle in the direction same as the turning direction, as described above. Specifically, the roll-over preventing control and the understeer restraining control have a directional property of the control that is reverse to each other. Therefore, in the disclosed device wherein the roll-over preventing control and the understeer restraining control can be simultaneously executed, either one of the controls increases control volume of the other one since both controls are simultaneously executed, so that both controls are dissipated. As a result, there arises a problem that the turning state of the vehicle may be unstable.

SUMMARY OF THE INVENTION

The present invention is accomplished to solve this problem, and aims to provide a vehicle motion control device that can simultaneously execute a roll-over preventing control and an understeer restraining control without bringing a turning state of a vehicle into an unstable state.

A vehicle motion control device according to the present invention has roll angle occurrence tendency index obtaining means for obtaining an excessive roll angle occurrence tendency index value that indicates a degree of tendency that an excessive roll angle occurs on the vehicle, roll-over preventing control means that exerts roll-over preventing braking force, that is for generating a yawing moment on the vehicle in the direction opposite to the turning direction of the vehicle, on a predetermined wheel of the vehicle, when the vehicle is in the turning state and the degree of tendency that the excessive roll angle occurs, that is indicated by the obtained excessive roll angle occurrence tendency index value, exceeds a predetermined degree, understeer tendency index obtaining means for obtaining an understeer tendency index value that indicates a degree of understeer tendency in the turning state of the vehicle, and understeer restraining control means that exerts understeer restraining braking force, that is for generating a yawing moment on the vehicle in the direction same as the turning direction of the vehicle, on a predetermined other wheel of the vehicle, when the degree of understeer tendency, that is indicated by the obtained understeer tendency index value, exceeds a predetermined degree, wherein the roll-over preventing braking force by the roll-over preventing control means and the understeer restraining braking force by the understeer restraining control means can simultaneously be exerted, this device further comprising understeer restraining braking force setting means that sets the understeer restraining braking force such that the understeer restraining braking force of when the degree of the understeer tendency is the same becomes smaller in case where the roll-over preventing braking force and the understeer restraining braking force are simultaneously exerted, compared to the case where the roll-over preventing braking force is not exerted but the understeer restraining braking force is exerted.

Here, the excessive roll angle occurrence tendency index value is, for example, any one of a lateral acceleration that is a component of an acceleration exerted on the vehicle in the side-to-side direction of the vehicle body, a yaw rate exerted on the vehicle, a roll angle caused on the vehicle, a roll angle speed that is a rate of change with time of the roll angle, an operation amount of a steering that changes a turning angle of a steering wheel of the vehicle and an operation speed of the steering, or a value based upon at least these factors, but it is not limited thereto.

Further, the understeer tendency index value is, for example, a value based upon a target value of a lateral acceleration related amount (for example, lateral acceleration, yaw rate or the like) showing a degree of turning of the vehicle calculated according to a predetermined rule defined in advance based upon at least a vehicle body speed and a steering operation amount and an actual value (detected value) of the lateral acceleration related amount, but it is not limited thereto.

In this case, the roll-over preventing control means is preferably configured to exert the roll-over preventing braking force on a front wheel at the outer side of the turning direction as the predetermined wheel, from the viewpoint of effectively generating the yawing moment in the direction opposite to the turning direction. Moreover, the understeer restraining control means is preferably configured to exert the understeer restraining braking force on a rear wheel at the inner side of the turning direction as the predetermined other wheel, from the viewpoint of effectively generating the yawing moment in the direction same as the turning direction.

In general, the degree that the turning state of the vehicle is unstable due to the occurrence of an excessive roll angle on the vehicle is greater than the degree that the turning state of the vehicle is unstable because the turning state of the vehicle is brought into an excessive understeer state. Accordingly, a degree of demand for preventing the occurrence of an excessive roll angle on the vehicle is frequently greater than a degree of demand for preventing that the turning state of the vehicle is brought into an excessive understeer state.

Therefore, in case where the roll-over preventing control and the understeer restraining control are simultaneously executed (specifically, in case where the roll-over preventing braking force and the understeer restraining braking force are simultaneously exerted), it is considered that the roll-over preventing control preferably takes priority over the understeer restraining control. On the other hand, the priority of the roll-over preventing control over the understeer restraining control decreases the degree of increasing the control volume of the understeer restraining control by the roll-over preventing control, thereby preventing that both controls are dissipated.

From this knowledge, the understeer restraining braking force setting means sets the understeer restraining braking force such that the understeer restraining braking force of when the degree of the understeer tendency is the same becomes smaller in case where the roll-over preventing braking force by the roll-over preventing control means and the understeer restraining braking force by the understeer restraining control means are simultaneously exerted, compared to the case where the roll-over preventing braking force is not exerted but the understeer restraining braking force is exerted. By this configuration, the understeer restraining braking force exerted on the predetermined other wheel is set smaller, so that the roll-over preventing control can take priority over the understeer restraining control, in case where the roll-over preventing control and the understeer restraining control are simultaneously executed, resulting in preventing that both controls are dissipated, and hence, the turning state of the vehicle is prevented from being unstable.

In the vehicle motion control device according to the present invention, the understeer restraining braking force setting means is preferably configured to change, according to the value of the roll-over preventing braking force exerted on the predetermined wheel, the degree of decreasing the understeer restraining braking force of when the degree of the understeer tendency is the same. This can change a degree of giving priority to the roll-over preventing control than to the understeer restraining control according to the value of the roll-over preventing braking force. Therefore, the degree of giving priority to the roll-over preventing control, which can be changed according to the value of the roll-over preventing braking force, can always be set to an optimum degree, thereby being capable of more effectively preventing that both controls are dissipated.

In case where a condition for executing the roll-over preventing control and a condition for executing the understeer restraining control are both established (specifically, in case where the degree of tendency that an excessive roll angle occurs exceeds a predetermined degree and the degree of the understeer tendency exceeds a predetermined degree), the vehicle motion control device according to the present invention may be configured to exert only the roll-over preventing braking force (i.e., to set the value of the understeer restraining braking force to "0"), instead of simultaneously exerting the roll-over preventing braking force and the understeer restraining braking force.

BRIEF DESCRIPTION OF THE DRAWINGS

FIG. 4 is a flowchart executed by the CPU shown in FIG. 1 for calculating a wheel speed or the like;

DESCRIPTION OF THE PREFERRED EMBODIMENT

Figure 1:
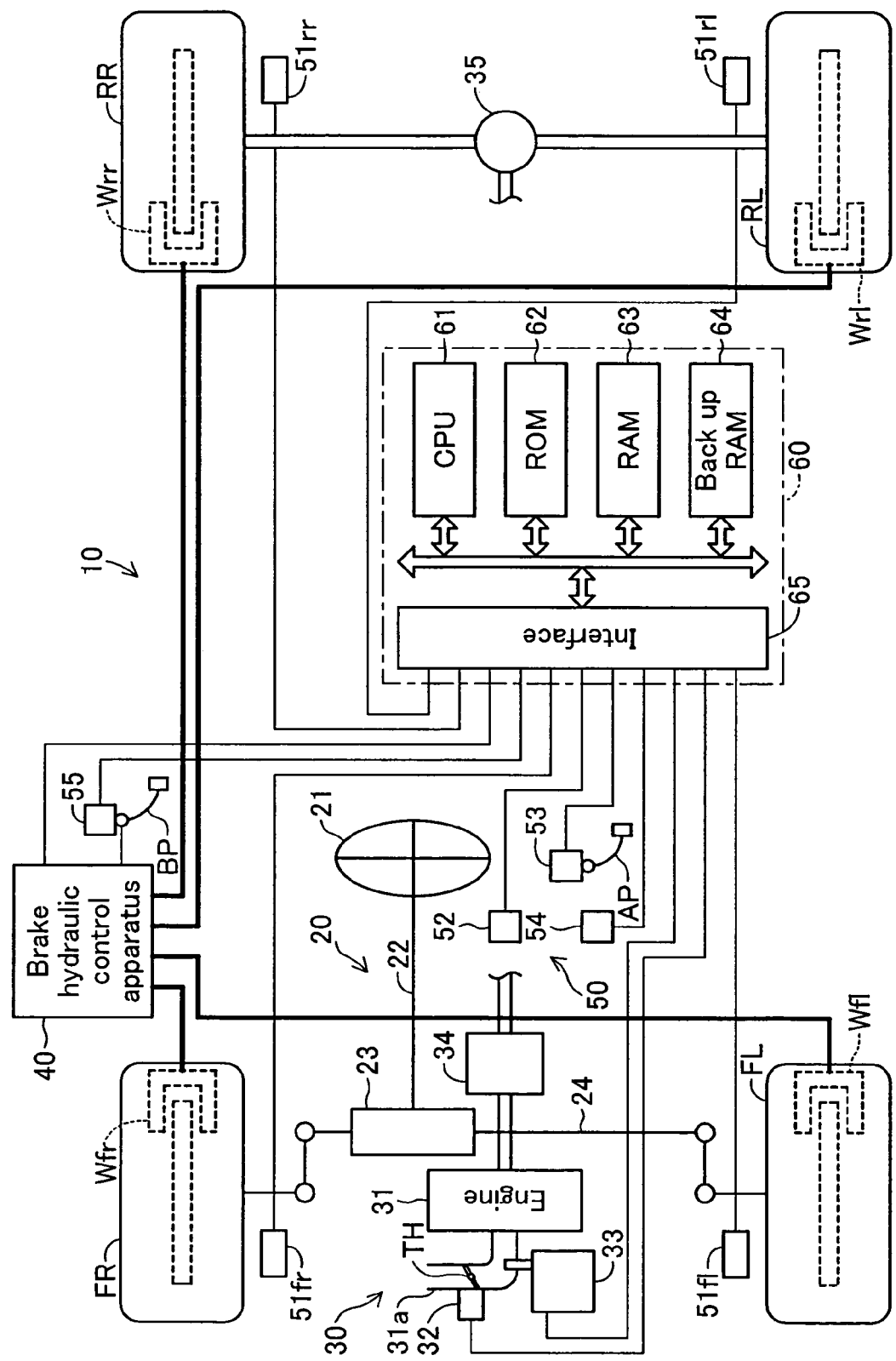
FIG. 1 is a schematic constructional view of a vehicle having mounted thereto a vehicle motion control device according to an embodiment of the present invention.

A preferred embodiment of a vehicle motion control device according to the present invention will be explained hereinbelow with reference to drawings. FIG. 1 shows a schematic construction of a vehicle provided with a vehicle control device 10 according to the embodiment of the invention. This vehicle is a four-wheel drive vehicle using a two-wheel steering rear-wheel drive system and having a pair of front wheels (front-left wheel FL and front-right wheel FR) that are steering wheels as well as non-driving wheels and a pair of rear wheels (rear-left wheel RL and rear-right wheel RR) that are non-steering wheels as well as driving wheels.

The vehicle motion control device 10 is configured to include a front-wheel steering mechanism 20 for steering the steering wheels FL and FR, a driving force transmission section 30 that produces driving force and respectively transmits this driving force to each driving wheel RL and RR, a brake hydraulic control apparatus 40 for producing braking force by brake fluid pressure on each wheel, a sensor section 50 composed of various sensors and an electrical control apparatus 60.

The front-wheel steering mechanism 20 is composed of a steering 21, column 22 integrally pivotable with the steering 21, steering actuator 23 linked to the column 22 and a link mechanism 24 including a tie rod that is moved in the side-to-side direction of the vehicle body by the steering actuator 23 and a link that can steer the steering wheels FL and FR by the movement of the tie rod. By this configuration, rotating the steering 21 from its center position (reference position) changes the steering angles of the steering wheels FL and FR from the reference angle at which the vehicle runs straight.

The steering actuator 23 is composed to include a known so-called hydraulic power steering device that generates assisting force for moving the tie rod according to the rotational torque of the column 22, thereby shifting the tie rod from the neutral position to the side-to-side direction of the vehicle by the assisting force in proportion to the steering angle θs from the neutral position of the steering 21. The configuration and operation of the steering actuator 23 are well known, so that the detailed explanation thereof is omitted here.

The driving force transmission section 30 is configured to include an engine 31 that produces driving force, a throttle valve actuator 32 arranged in an inlet pipe 31a of the engine 31 and having a DC motor for controlling an opening of a throttle valve TH that can modulate the cross-sectional area of the inlet path, a fuel injection device 33 including an injector that injects fuel to the vicinity of an inlet port not shown of the engine 31, a transmission 34 connected to the output shaft of the engine 31 and a differential gear 36 that suitably distributes and transmits the driving force transmitted from the transmission 34 to rear wheels RR and RL.

Figure 2:
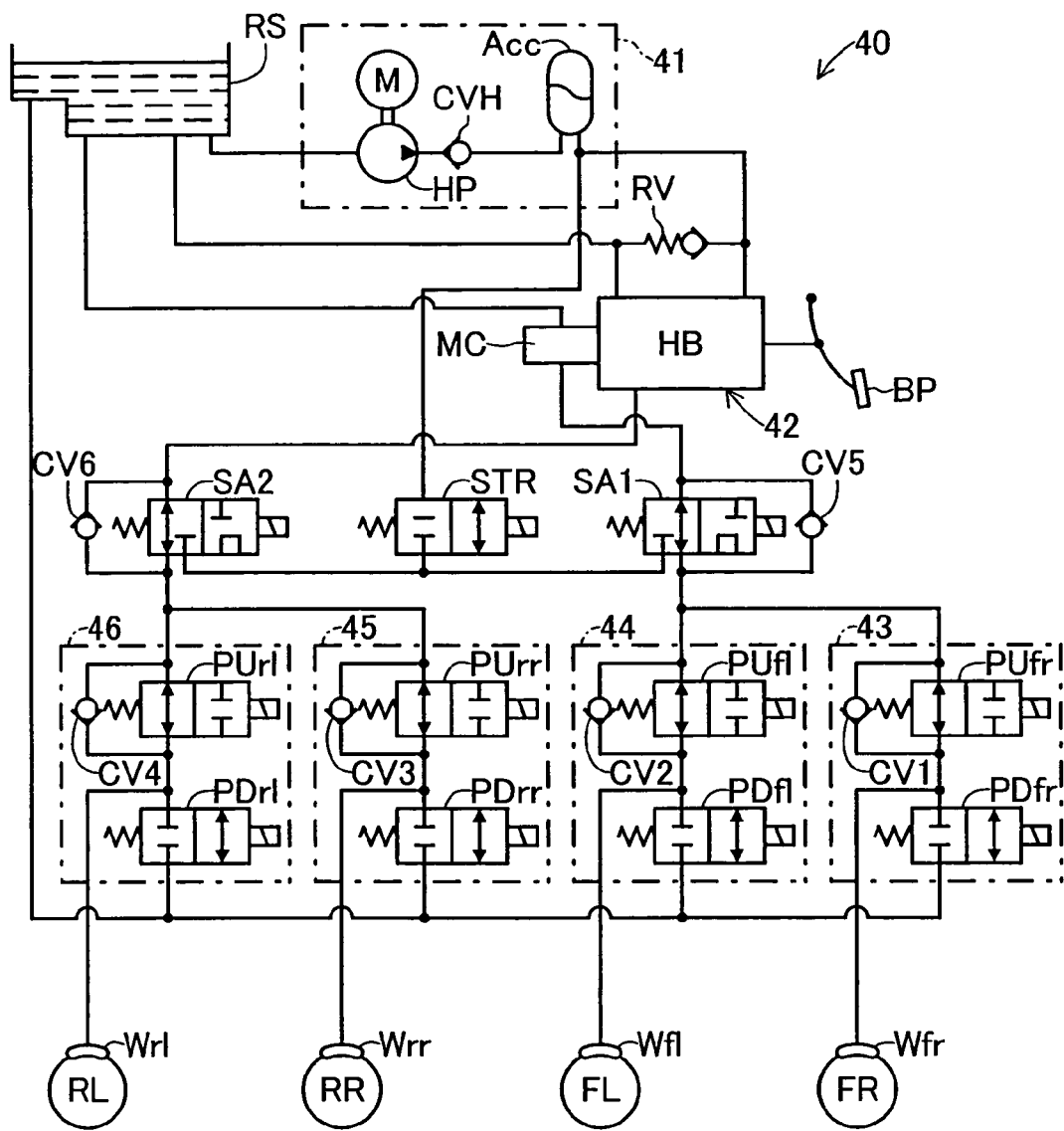
FIG. 2 is a schematic constructional view of a brake hydraulic control device shown in FIG. 1.

The brake hydraulic control apparatus 40 whose construction is schematically shown in FIG. 2 is configured to include a high-pressure generating section 41, a brake fluid pressure generating section 42 that generates brake fluid pressure according to operating force on a brake pedal BP, and an FR brake fluid pressure adjusting section 43, an FL brake fluid pressure adjusting section 44, an RR brake fluid pressure adjusting section 45 and an RL brake fluid pressure adjusting section 46 that are capable of adjusting brake fluid pressure supplied respectively to wheel cylinders Wfr, Wfl, Wrr and Wrl each arranged at each wheel FR, FL, RR and RL.

The high-pressure generating section 41 is configured to include an electric motor M, a hydraulic pump HP driven by the electric motor M and pressurizing brake fluid in a reservoir RS and an accumulator Acc that is connected to the discharge side of the hydraulic pump HP via a check valve CVH and stores brake fluid pressurized by the hydraulic pump HP.

The electric motor M is driven when the fluid pressure in the accumulator Acc is less than a predetermined lower limit value, while it is halted when the fluid pressure in the accumulator Acc exceeds a predetermined upper limit value. By this, the fluid pressure in the accumulator Acc is always kept high within a predetermined range.

A relief valve RV is arranged between the accumulator Acc and the reservoir RS. When the fluid pressure in the accumulator Acc becomes extraordinarily higher than the above-mentioned high pressure, the brake fluid in the accumulator Acc is returned to the reservoir RS. This operation protects a hydraulic circuit in the high-pressure generating section 41.

The brake hydraulic generating section 42 is composed of a hydraulic booster HB that is driven according to the operation of the brake pedal BP and a master cylinder MC connected to the hydraulic booster HB. The hydraulic booster HB assists the operating force on the brake pedal BP at a predetermined ratio by utilizing the above-mentioned high pressure supplied from the high-pressure generating section 41 and transmits the assisted operating force to the master cylinder MC.

The master cylinder MC generates master cylinder fluid pressure according to the assisted operating force. Further, the hydraulic booster HB, by inputting this master cylinder fluid pressure, generates regulator fluid pressure that is approximately equal to the master cylinder fluid pressure according to the assisted operating force. The constructions and operations of the master cylinder MC and hydraulic booster HB are well known, so that their detailed explanations are omitted here. As described above, the master cylinder MC and hydraulic booster HB respectively generate master cylinder fluid pressure and regulator fluid pressure according to the operating force on the brake pedal BP.

A control valve SA1 that is a three-port two-position switching type solenoid-operated valve is arranged between the master cylinder MC and each of the upstream side of the FR brake fluid pressure adjusting section 43 and the upstream side of the FL brake fluid pressure adjusting section 44. Similarly, a control valve SA2 that is a three-port two-position switching type solenoid-operated valve is arranged between the hydraulic booster HB and each of the upstream side of the RR brake fluid pressure adjusting section 45 and the upstream side of the RL brake fluid pressure adjusting section 46. Further, a change-over valve STR that is a two-port two-position switching type, normally closed, solenoid-operated on-off valve is arranged between the high-pressure generating section 41 and each of the control valve SA1 and the control valve SA2.

When the control valve SA1 is in the first position in FIG. 2 (in the non-actuated position), it functions to establish communication between the master cylinder MC and each of the upstream section of the FR brake fluid pressure adjusting section 43 and the upstream section of the FL brake fluid pressure adjusting section 44. When in the second position (in the actuated position), it functions to cut off the communication between the master cylinder MC and each of the upstream section of the FR brake fluid pressure adjusting section 43 and the upstream section of the FL brake fluid pressure adjusting section 44, but to establish the communication between the change-over valve STR and each of the upstream section of the FR brake fluid pressure adjusting section 43 and the upstream section of the FL brake fluid pressure adjusting section 44.

When the control valve SA2 is in the first position in FIG. 2 (in the non-actuated position), it functions to establish communication between the hydraulic booster HB and each of the upstream section of the RR brake fluid pressure adjusting section 45 and the upstream section of the RL brake fluid pressure adjusting section 46. When in the second position (in the actuated position), it functions to cut off the communication between the hydraulic booster HB and each of the upstream section of the RR brake fluid pressure adjusting section 45 and the upstream section of the RL brake fluid pressure adjusting section 46, but to establish the communication between the change-over valve STR and each of the upstream section of the RR brake fluid pressure adjusting section 45 and the upstream section of the RL brake fluid pressure adjusting section 46.

By this operation, master cylinder fluid pressure is supplied to each of the upstream section of the FR brake fluid pressure adjusting section 43 and the upstream section of the FL brake fluid pressure adjusting section 44 when the control valve SA1 is placed at the first position, while high pressure generated from the high-pressure generating section 41 is supplied thereto when the control valve SA1 is placed at the second position and the change-over valve STR is placed at the second position (at the actuated position).

Similarly, regulator fluid pressure is supplied to each of the upstream section of the RR brake fluid pressure adjusting section 45 and the upstream section of the RL brake fluid pressure adjusting section 46 when the control valve SA2 is placed at the first position, while high pressure generated from the high-pressure generating section 41 is supplied thereto when the control valve SA2 is placed at the second position and the change-over valve STR is placed at the second position.

The FR brake fluid pressure adjusting section 43 is composed of a pressure increasing valve PUfr that is a two-port two-position switching type, normally opened, solenoid-operated on-off valve and a pressure reducing valve PDfr that is a two-port two-position switching type, normally closed, solenoid-operated on-off valve. The pressure increasing valve PUfr, when placed at the first position in FIG. 2 (at the non-actuated position), establishes a communication between the upstream section of the FR brake fluid pressure adjusting section 43 and the wheel cylinder Wfr, while it cuts off the communication between the upstream section of the FR brake fluid pressure adjusting section 43 and the wheel cylinder Wfr when placed at the second position (at the actuated position). The pressure reducing valve PDfr cuts off the communication between the wheel cylinder Wfr and the reservoir RS when it is placed at the first position in FIG. 2 (at the non-actuated position), while it establishes the communication between the wheel cylinder Wfr and the reservoir RS when placed at the second position (at the actuated position).

By this operation, the brake fluid pressure in the wheel cylinder Wfr is increased when the pressure increasing valve PUfr and the pressure reducing valve PDfr are placed at the first position since the fluid pressure at the upstream section of the FR brake fluid pressure adjusting section 43 is supplied into the wheel cylinder Wfr. When the pressure increasing valve PUfr is placed at the second position and the pressure reducing valve PDfr is placed at the first position, the brake fluid pressure in the wheel cylinder Wfr is kept to be the fluid pressure at the time in the wheel cylinder Wfr regardless of the fluid pressure at the upstream section of the FR brake fluid pressure adjusting section 43. When the pressure increasing valve PUfr and the pressure reducing valve PDfr are placed at the second position, the brake fluid in the wheel cylinder Wfr is returned to the reservoir RS to thereby reduce the fluid pressure.

A check valve CV1 is arranged in parallel to the pressure increasing valve PUfr for allowing only one-way flow of the brake fluid from the wheel cylinder Wfr side to the upstream section of the FR brake fluid pressure adjusting section 43. This arrangement brings a rapid reduction of the brake fluid pressure in the wheel cylinder Wfr when the brake pedal BP is released with the control valve SA1 placed at the first position.

Similarly, the FL brake fluid pressure adjusting section 44, RR brake fluid pressure adjusting section 45 and RL brake fluid pressure adjusting section 46 are respectively composed of a pressure increasing valve PUfl and pressure reducing valve PDfl, a pressure increasing valve PUrr and pressure reducing valve PDrr and a pressure increasing valve PUrl and pressure reducing valve PDrl. The position of each pressure increasing valve and pressure reducing valve is controlled, whereby the brake fluid pressure in the wheel cylinder Wfl, wheel cylinder Wrr and wheel cylinder Wrl can be increased, kept and reduced. Further, check valves CV2, CV3 and CV4 that can attain the function same as that of the check valve CV1 are respectively arranged in parallel to the pressure increasing valves PUfl, PUrr and PUrl.

A check valve CV5 is arranged in parallel to the control valve SA1 for allowing only one-way flow of the brake fluid from the upstream side to the downstream side. When the control valve SA1 is placed at the second position and the communication between the master cylinder MC and each of the FR brake fluid pressure adjusting section 43 and the FL brake fluid pressure adjusting section 44 is cut off, the brake fluid pressure in the wheel cylinders Wfr and Wfl can be increased by operating the brake pedal BP. Further, arranged in parallel to the control valve SA2 is a check valve CV6 that can attain the function same as that of the check valve CV5.

By the construction described above, the brake hydraulic control apparatus 40 can supply brake fluid pressure according to the operating force on the brake pedal BP to each wheel cylinder when all the solenoid-operated valves are in the first position. Further, under this state, it can reduce, for example, only the brake fluid pressure in the wheel cylinder Wrr by a predetermined amount by controlling the pressure increasing valve PUrr and pressure reducing valve PDrr.

By changing the control valve SA1, change-over valve STR and pressure increasing valve PUfl to the second position and controlling the pressure increasing valve PUfr and pressure reducing valve PDfr respectively, the brake hydraulic control apparatus 40 can increase only the brake fluid pressure in the wheel cylinder Wfr by a predetermined value by utilizing the high pressure generated from the high-pressure generating section 41 while the brake fluid pressure in the wheel cylinder Wfl is maintained under a state where the brake pedal BP is not operated (is released). As described above, the brake hydraulic control apparatus 40 independently controls the brake fluid pressure in the wheel cylinder of each wheel regardless of the operation on the brake pedal BP, thereby being capable of exerting predetermined braking force on every independent wheel.

Referring again to FIG. 1, the sensor section 50 is composed of wheel speed sensors 51fl, 51fr, 51rl and 51rr each constructed by a rotary encoder that outputs a signal having a pulse every time each wheel FL, FR, RL and RR rotates at a predetermined angle, a steering angle sensor 52, serving as steering operating amount obtaining means, for detecting the angle of rotation from the neutral position of the steering 21 to output a signal showing a steering angle θs (deg), an accelerator opening sensor 53 that detects an operating amount of an accelerator pedal AP operated by a driver and outputs a signal showing the operating amount Accp of the accelerator pedal AP, a lateral acceleration sensor 54 that detects an actual lateral acceleration, as an excessive roll angle occurrence tendency index value, which is a component in the side-to-side direction of a vehicle body of the acceleration actually exerted on the vehicle, and outputs a signal showing the actual lateral acceleration Gy (m/s$^2$) for serving as index value obtaining means and a brake switch 55 that detects whether the brake pedal BP is operated or not by the driver for outputting a signal showing that the braking operation is performed or not.

The steering angle θs is set to be "0" when the steering 21 is positioned at the neutral position, set to a positive value when the steering 21 is rotated in the counterclockwise direction (seen by a driver) from the neutral position, and set to a negative value when the steering 21 is rotated in the clockwise direction from the neutral position. Further, the actual lateral acceleration Gy is set to be a positive value when the vehicle is turning in the counterclockwise direction (seen from the top of the vehicle), while set to be a negative value when the vehicle is turning in the clockwise direction (seen from the top of the vehicle).

The electrical control apparatus 60 is a microcomputer including a CPU 61, a ROM 62 that stores in advance a routine (program) executed by the CPU 61, table (look-up table, map), constant or the like, a RAM 63 to which the CPU 61 temporarily stores data as needed, a back-up RAM 64 that stores data with a power supply turned on and holds the stored data even during a period when the power supply is turned off and an interface 65 including an AD converter, those of which are connected to one another with a bus. The interface 65 is connected to the sensors 51 to 55, thereby supplying to the CPU 61 signals from the sensors 51 to 55 and transmitting a driving signal to each solenoid-operated valve and motor M of the brake hydraulic control apparatus 40, the throttle valve actuator 32 and the fuel injection device 33 according to the instruction from the CPU 61.

By this operation, the throttle valve actuator 32 drives the throttle valve TH such that the opening thereof becomes an opening according to the operating amount Accp of the accelerator pedal AP, and the fuel injection device 33 injects fuel in a required amount so as to obtain a predetermined target air-fuel ratio (theoretical air-fuel ratio) concerning intake air mass according to the opening of the throttle valve TH.

[Outline of Vehicle Motion Control]

The vehicle motion control device 10 calculates the target lateral acceleration Gyt (m/s$^2$) based upon a following formula (1) that is a theoretical formula as a predetermined rule directed from a vehicle motion model. The target lateral acceleration Gyt is set to the positive value when the steering angle θs (deg) is a positive value, while it is set to the negative value when the steering angle θs is a negative value. This theoretical formula is a formula for calculating a theoretical value of the lateral acceleration exerted on the vehicle when the vehicle turns with the steering angle and vehicle body speed constant (upon the normal circular turn).

$$Gyt=(Vso^2 \cdot \theta s)/(n \cdot I) \cdot (1/(1+Kh \cdot Vso^2)) \quad (1)$$

In the above formula (1), Vso is a calculated estimated body speed (m/s) as described later. Further, n is a gear ratio (constant value) that is a ratio of a change amount of a rotation angle of the steering 21 to a change amount of a turning angle of the steering wheels FL and FR, I is a wheel base (m) of the vehicle that is a constant value determined by the vehicle body, and Kh is a stability factor (s$^2$/m$^2$) that is a constant value determined by the vehicle body.

Further, this device also calculates a lateral acceleration deviation ΔGy (m/s$^2$), based upon the formula (2) described later, that is a deviation between the absolute value of the target lateral acceleration Gyt calculated as described above and the absolute value of the actual lateral acceleration Gy detected by the lateral acceleration sensor 54. This lateral acceleration deviation ΔGy corresponds to the understeer tendency index value.

$$\Delta Gy=|Gyt|-|Gy| \quad (2)$$

[Understeer Restraining Control]

When the value of the lateral acceleration deviation ΔGy is greater than a positive predetermined value Gy1, the vehicle is in a state where the turning radius is greater than the turning radius of when the target lateral acceleration Gyt is assumed to be caused on the vehicle (hereinafter referred to as "understeer state"), whereby this device judges that the turning state of the vehicle is the understeer state and executes an understeer restraining control (hereinafter referred to as "US restraining control") for restraining the understeer state.

Specifically, this device exerts predetermined braking force (understeer restraining braking force) according to the value of the lateral acceleration deviation ΔGy on only the rear wheel at the inner side of the turning direction, thereby forcibly producing a yawing moment on the vehicle in the direction same as the turning direction. This allows to increase the absolute value of the actual lateral acceleration Gy, so that the actual lateral acceleration Gy is controlled to be close to the target lateral acceleration Gyt.

[Oversteer Restraining Control]

On the other hand, when the value of the lateral acceleration deviation ΔGy is smaller than a negative predetermined value −Gy1, the vehicle is in a state where the turning radius is smaller than the turning radius of when the target lateral acceleration Gyt is assumed to be caused on the vehicle (hereinafter referred to as "oversteer state"), whereby this device judges that the turning state of the vehicle is the oversteer state and executes an oversteer restraining control (hereinafter referred to as "OS restraining control") for restraining the overseer state.

Specifically, this device exerts predetermined braking force (oversteer restraining braking force) according to the value of the lateral acceleration deviation ΔGy on only the front wheel at the outer side of the turning direction, thereby forcibly producing a yawing moment on the vehicle in the direction opposite to the turning direction. This allows to decrease the absolute value of the actual lateral acceleration Gy, so that the actual lateral acceleration Gy is controlled to be close to the target lateral acceleration Gyt.

As described above, the understeer restraining control or the oversteer restraining control is executed, whereby this device controls the braking force that should be exerted on each wheel, thereby producing a predetermined yawing moment on the vehicle in the direction that the actual lateral acceleration Gy is close to the target lateral acceleration Gyt calculated according to the above-mentioned formula (1). It should be noted that the understeer restraining control and the oversteer restraining control are executed based upon the same index value that is the lateral acceleration deviation ΔGy, and the value of the lateral acceleration deviation ΔGy (>Gy1) upon executing the understeer restraining control and the value of the lateral acceleration deviation ΔGy (<−Gy1) upon executing the oversteer restraining control do not overlap with each other. Accordingly, the understeer restraining control and the oversteer restraining control are not simultaneously executed.

[Roll-over Preventing Control]

Moreover, when the absolute value (the excessive roll angle occurrence tendency index) of the actual lateral acceleration Gy detected by the lateral acceleration sensor 54 is greater than a positive predetermined value Gyr1, which means that there is a tendency that an excessive roll angle occurs on the vehicle body, this device executes a roll-over preventing control for restraining (decreasing) an increase in the roll angle.

Specifically, like the OS restraining control, this device generates predetermined braking force (roll-over preventing braking force) according to the absolute value of the actual lateral acceleration Gy on only the front wheel at the outer side of the turning direction, thereby forcibly generating a yawing moment on the vehicle in the direction opposite to the turning direction. This decreases the absolute value of the actual lateral acceleration Gy to thereby decrease the centrifugal force exerted on the vehicle, resulting in restraining the increase in the roll angle.

[Measure in Case where Roll-over Preventing Control and OS Restraining Control are Simultaneously Executed]

This device can simultaneously execute the roll-over preventing control and either one of the OS restraining control and the US restraining control. Firstly explained is the case where the roll-over preventing control and the OS restraining control are simultaneously executed. In this case, wheel to which braking force is exerted (specifically, the front wheel at the outer side of the turning direction) is the same (i.e., the direction of property of each control is the same). However, the braking force (roll-over preventing braking force) is determined according to the absolute value of the actual lateral acceleration Gy in the roll-over preventing control, while the braking force (oversteer restraining braking force) is determined according to the value of the lateral acceleration deviation ΔGy, that is difference from the absolute value of the actual lateral acceleration Gy, in the OS restraining control, so that the braking forces that should be exerted by both controls are different from each other.

In this case, it is considered that the greater braking force is preferably exerted from the viewpoint of surely preventing that the turning state of the vehicle becomes unstable. Therefore, this device exerts the greater braking force of the roll-over preventing braking force determined according to the absolute value of the actual lateral acceleration Gy and the oversteer restraining braking force determined according to the value of the lateral acceleration deviation ΔGy on the front wheel at the outer side of the turning direction, in case where the roll-over preventing control and the OS restraining control are simultaneously executed.

[Measure in Case where Roll-over Preventing Control and US Restraining Control are Simultaneously Executed]

Subsequently explained is the case where the roll-over preventing control and the US restraining control are simultaneously executed. In this case, the direction property of each control is reverse to each other as previously explained, so that there is a possibility that one of the controls increases the control volume of the other one, resulting in that both controls are dissipated. Therefore, either one of these controls is required to be given priority over the other one in this case. Further, a degree of demand for preventing the occurrence of an excessive roll angle on the vehicle is frequently greater than a degree of demand for preventing that the turning state of the vehicle is brought into an excessive understeer state.

From the above, in case where the roll-over preventing control and the US restraining control are simultaneously executed, this device gives priority to the roll-over preventing control as described later. Firstly, in order to determine the degree of giving priority to the roll-over preventing control over the understeer restraining control, this device calculates an understeer restraining braking force damping factor α ($0 \leq \alpha \leq 1$) based upon the roll-over preventing braking force determined according to the absolute value of the actual lateral acceleration Gy. This understeer restraining braking force damping factor α is calculated so as to decrease as the value of the roll-over preventing braking force increases.

Then, this device exerts on a rear wheel at the inner side of the turning direction new understeer restraining braking force obtained by multiplying the value of the understeer restraining braking force determined according to the lateral acceleration deviation ΔGy by the calculated understeer restraining braking force damping factor α, and exerts on the front wheel at the outer side of the turning direction the roll-over preventing braking force itself according to the absolute value of the actual lateral acceleration Gy. This allows to give priority to the roll-over preventing control over the understeer restraining control according to the understeer restraining braking force damping factor a (accordingly, the value of the roll-over preventing braking force).

The case where the roll-over preventing control takes priority over the understeer restraining control will specifically be explained hereinbelow with reference to FIG. 3. It is supposed that the understeer tendency increases with a state in which a vehicle turns in the counterclockwise direction (seen from the top of the vehicle), and the value of the lateral acceleration deviation ΔGy exceeds the positive predetermined value Gy1.

Figure 3:
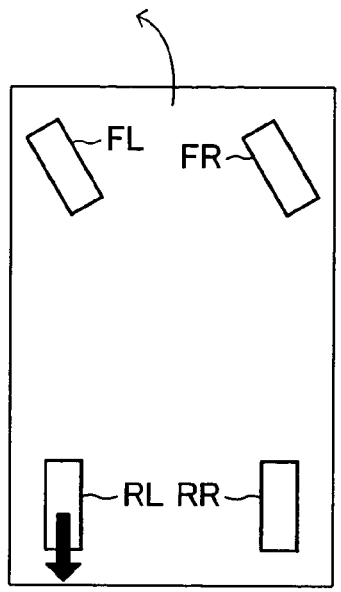
FIG. 3(a) is a view showing one example of braking force exerted on each wheel of a vehicle in case where only an US restraining control is executed during when the vehicle is turning in the counterclockwise direction (seen from the top of the vehicle)
FIG. 3(b) is a view showing one example of braking force exerted on each wheel of a vehicle in case where the US restraining control and a roll-over preventing control are simultaneously executed during when the vehicle is turning in the counterclockwise direction (seen from the top of the vehicle)
Figure 3:
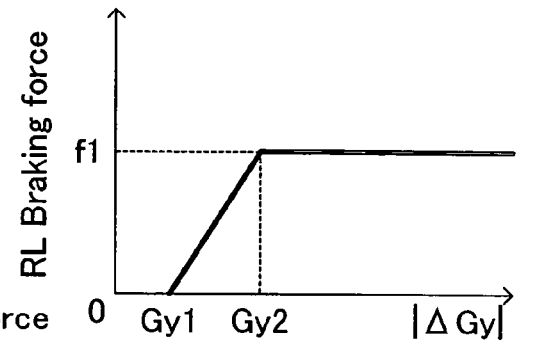
Figure 3:
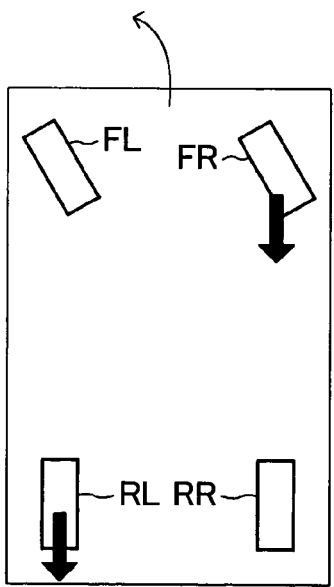
Figure 3:
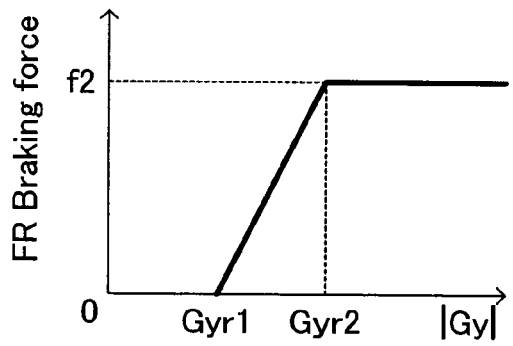
Figure 3:
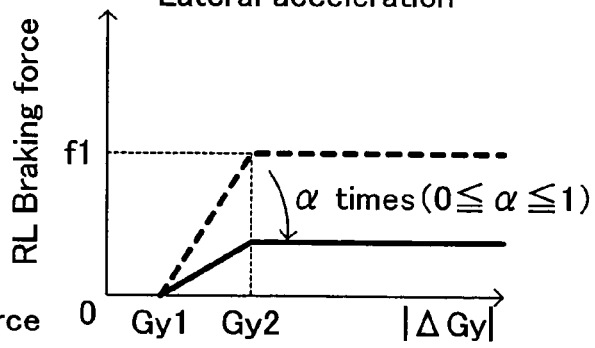

In this case, this device causes the understeer restraining braking force according to the absolute value of the lateral acceleration deviation ΔGy only on the rear wheel at the inner side of the turning direction (the rear-left wheel RL in FIG. 3) in order to execute only the understeer restraining control, as shown in FIG. 3(*a*). This understeer restraining braking force is set as follows according to a predetermined table stored in the ROM 62. Specifically, it is set so as to linearly change from "0" to a rear-wheel-side upper limit value f1 as the absolute value of the lateral acceleration deviation ΔGy is changed from the value Gy1 to a value Gy2 when the absolute value of the lateral acceleration deviation ΔGy is not less than the value Gy1 and not more than the value Gy2. Further, it is set so as to keep the rear-wheel-side upper limit value f1 when the absolute value of the lateral acceleration deviation ΔGy is not less than the value Gy2.

This allows to forcibly generate the yawing moment on the vehicle in the direction same as the turning direction. It is supposed that, as a result, the absolute value of the actual lateral acceleration Gy increases and hence the absolute value of the actual lateral acceleration Gy exceeds the positive predetermined value Gyr1 with the value of the lateral acceleration deviation ΔGy kept to be greater than the positive predetermined value Gy1.

In this case, this device simultaneously executes the roll-over preventing control and the understeer restraining control while giving priority to the roll-over preventing control, as shown in FIG. 3(b). Specifically, this device causes the roll-over preventing braking force according to the absolute value of the actual lateral acceleration Gy on the front wheel at the outer side of the turning direction (the front-right wheel FR in FIG. 3). This roll-over preventing braking force is set as follows according to a predetermined table stored in the ROM 62. Specifically, it is set so as to linearly increase from "0" to a front-wheel-side upper limit value f2 as the absolute value of the actual lateral acceleration Gy is changed from the value Gyr1 to a value Gyr2 when the absolute value of the actual lateral acceleration Gy is not less than the value Gyr1 and not more than the value Gyr2. Further, it is set so as to keep the front-wheel-side upper limit value f2 when the absolute value of the actual lateral acceleration Gy is not less than the value Gyr2.

At the same time, this device obtains the understeer restraining braking force damping factor α (0≦α≦1) based upon the roll-over preventing braking force, thereby generating on a rear wheel at the inner side of the turning direction (the rear-left wheel RL in FIG. 3) new understeer restraining braking force obtained by multiplying the value same as the understeer restraining braking force (i.e., the table value) according to the absolute value of the lateral acceleration deviation ΔGy shown in FIG. 3(a) by the understeer restraining braking force damping factor α.

As described above, this device sets the value obtained by multiplying the understeer restraining braking force as the table value by the understeer restraining braking force damping factor α (0≦α≦1) as new understeer restraining braking force, thereby setting the value of the understeer restraining braking force such that the understeer restraining braking force of when the lateral acceleration deviation ΔGy (accordingly, the degree of the understeer tendency) is the same is decreased, in case where the roll-over preventing control and the understeer restraining control are simultaneously executed, compared to the case where only the understeer restraining control is executed. Then, this device sets the understeer restraining braking force damping factor α based upon the value of the roll-over preventing braking force, whereby the degree of decreasing the understeer restraining braking force is changed according to the roll-over preventing braking force.

As described above, this device executes the US restraining control, OS restraining control and roll-over preventing control (hereinafter generically referred to as "stability control upon turning") to thereby exert predetermined braking force on each wheel for ensuring stability of the vehicle. Further, when any one of anti-skid control, front-rear braking force distribution control and traction control described later is also required to be executed upon executing the stability control upon turning, this device finally determines the braking force that should be exerted on each wheel by considering also the braking force that should be exerted on each wheel for executing any one of the above-mentioned controls. The above description is about the outline of the vehicle motion control.

(Actual operation)

Subsequently, the actual operation of the vehicle motion control device 10 of the present invention and having the above-mentioned construction will be explained hereinbelow with reference to FIGS. 4 to 9 showing routines with flowcharts executed by the CPU 61 of the electrical control apparatus 60. The symbol "" marked at the end of the various variables, flags, symbols or the like is a comprehensive expression of "fl", "fr" or the like marked at the end of the various variables, flags or symbols for showing which wheel such as FR or the like is related to the various variables, flags, symbols or the like. For example, the wheel speed Vw comprehensively represents the front-left wheel speed Vwfl, front-right wheel speed Vwfr, rear-left wheel speed Vwrl and rear-right wheel speed Vwrr.

Figure 4:
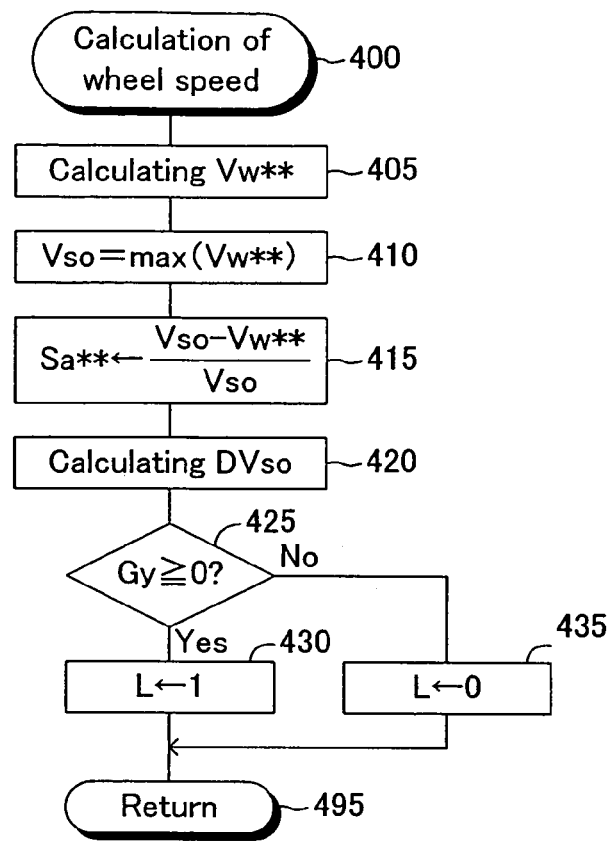

The CPU 61 repeatedly executes a routine shown in FIG. 4 for calculating the wheel speed Vw or the like once every predetermined period. Accordingly, the CPU 61 starts the process from a step 400 at a predetermined timing, and then proceeds to a step 405 to respectively calculate the wheel speed (outer peripheral speed of a tire) Vw (m/s) of each wheel FR or the like. Specifically, the CPU 61 calculates the respective wheel speeds Vw of each wheel FR or the like based upon a time interval of a pulse possessed by a signal outputted from each wheel speed sensor 51.

Then, the CPU 61 moves to a step 410 to calculate the maximum value among the wheel speeds Vw of each wheel FR as the estimated body speed Vso. It is to be noted that the average value of the wheel speeds Vw of each wheel FR or the like may be calculated as the estimated body speed Vso.

Then, the CPU 61 moves to a step 415 to calculate an actual slip ratio Sa of every wheel based upon the estimated body speed Vso calculated at the step 410, the value of the wheel speeds Vw of each wheel FR or the like calculated at the step 405 and the formula described in the step 415. This actual slip ratio Sa** is used for calculating the braking force that should be exerted on each wheel as described later.

Then, the CPU 61 proceeds to a step 420 for calculating an estimated vehicle body acceleration DVso that is a time derivative value of the estimated body speed Vso based upon a formula (3) described later. In the formula (3), Vso1 is the previous estimated body speed calculated at the step 410 at the time of the previous execution of this routine, while Δt is the above-mentioned predetermined time that is the operation period of this routine.

$$DVso = (Vso - Vso1)/\Delta t \quad (3)$$

Subsequently, the CPU 61 moves to a step 425 to determine whether the value of the actual lateral acceleration Gy detected by the lateral acceleration sensor 54 is not less than "0" or not. If the value of the actual lateral acceleration Gy is not less than "0", the CPU 61 makes "YES" determination at the step 425, and then, moves to a step 430 to set a turning direction indicating flag L to "1". Then, the CPU 61 moves to a step 495 to temporarily terminate this routine. Further, if the value of the actual lateral acceleration Gy is a negative value, the CPU 61 makes "NO" determination at the step 425, and then, proceeds to a step 435 to set the turning direction indicating flag L to "0". Then, the CPU 61 moves to the step 495 to temporarily terminate this routine.

The turning direction indicating flag L indicates that the vehicle turns in the counterclockwise direction (seen from the top of the vehicle) when the value thereof is "1", while indicates that the vehicle turns in the clockwise direction (seen from the top of the vehicle) when the value thereof is "0". Accordingly, the turning direction of the vehicle is specified by the value of the turning direction indicating flag L.

Subsequently explained is the calculation of the lateral acceleration deviation. The CPU 61 repeatedly executes a routine shown in FIG. 5 once every predetermined period. Accordingly, the CPU 61 starts the process from a step 500 at a predetermined timing, and then proceeds to a step 505 to calculate the target lateral acceleration Gyt based upon the value of the steering angle θs detected by the steering angle sensor 52, the value of the estimated body speed Vso calculated at the step 410 in FIG. 4 and the formula described in the step 505 and corresponding to the right side of the formula (1).

Then, the CPU 61 proceeds to a step 510 to calculate the lateral acceleration deviation ΔGy based upon the value of the target lateral acceleration Gyt calculated at the step 505, the value of the actual lateral acceleration Gy detected by the lateral acceleration sensor 54 and the formula described in the step 510 and corresponding to the right side of the formula (2). Then, the CPU 61 proceeds to a step 595 to temporarily terminate this routine.

Figure 5:
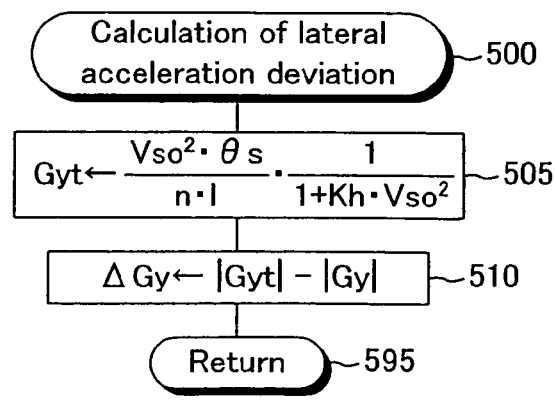
FIG. 5 is a flowchart executed by the CPU shown in FIG. 1 for calculating a lateral acceleration deviation.

Subsequently explained is the calculation of control volume G for the OS-US restraining control required to determine the braking force that should be exerted on each wheel upon executing only the above-mentioned OS-US restraining control. The CPU 61 repeatedly executes a routine shown in FIG. 6 once every predetermined period. Accordingly, the CPU 61 starts the process from a step 600 at a predetermined timing, and then proceeds to a step 605 to determine whether the value of the lateral acceleration deviation ΔGy calculated at the previous step 505 in FIG. 5 is greater than the positive predetermined value Gt1 or not.

The explanation is continued here assuming that the absolute value of the lateral acceleration deviation ΔGy is greater than the positive predetermined value Gy1. The CPU 61 makes "YES" determination at the step 605, and then, proceeds to the step 610 to calculate control volume G for the OS-US restraining control based upon the absolute value of the lateral acceleration deviation ΔGy and the table described in the step 610 and corresponding to the table shown in FIG. 3(a). The upper limit value G1 of the control volume G for the OS-US restraining control is a value corresponding to the above-mentioned rear-wheel-side upper limit value f1.

Then, the CPU 61 proceeds to a step 615 to determine whether the lateral acceleration deviation ΔGy takes a positive value or not. If the lateral acceleration deviation ΔGy takes a positive value, the CPU 61 makes "YES" determination, which means that the vehicle is in the understeer state, and then, moves to a step 620 to set a value of control volume for the OS restraining control to "0" and set the value of the control volume G for the OS-US restraining control to control volume Gu for the US restraining control. Thereafter, the CPU 61 sets a value of a US restraining control now-executing flag UNDER to "1" at a step 625, and then, proceeds to a step 695 to temporarily terminate this routine. The US restraining control now-executing flag UNDER indicates that the US restraining control is now being executed when the value thereof is "1", while indicates that the US restraining control is not executed when the value thereof is "0".

On the other hand, the lateral acceleration deviation ΔGy takes a negative value in the judgement at the step 615, the CPU 61 makes "NO" determination, which means that the vehicle is in the oversteer state, and then, moves to a step 630 to set the value of the control volume Gu for the US restraining control to "0" and set the value of the control volume G for the OS-US restraining control to the control volume Go for the OS restraining control. Thereafter, the CPU 61 proceeds to the step 695 to temporarily terminate this routine.

Further, if the absolute value of the lateral acceleration deviation ΔGy is not more than the positive predetermined value Gy1 in the judgement at the step 605, which means that the OS-US restraining control is not necessarily executed, the CPU 61 moves to a step 635 to set both values of the control volume Gu for the US restraining control and the control volume Go for the OS restraining control to "0", and then, moves to the next step 640 to set the value of the US restraining control now-executing flag UNDER to "0". Thereafter, the CPU 61 proceeds to the step 695 to temporarily terminate this routine. In this way, the control volume Gu for the US restraining control and the control volume Go for the OS restraining control are set.

Subsequently explained is the calculation of control volume Gr for the roll-over preventing control required to determine the braking force that should be exerted on each wheel upon executing only the above-mentioned roll-over preventing control. The CPU 61 repeatedly executes a routine shown in FIG. 7 once every predetermined period. Accordingly, the CPU 61 starts the process from a step 700 at a predetermined timing, and then proceeds to a step 705 to determine whether the value of the actual lateral acceleration Gy detected by the lateral acceleration sensor 54 is greater than the positive predetermined value Gyr1 or not.

The explanation is continued here assuming that the absolute value of the actual lateral acceleration Gy is greater than the positive predetermined value Gyr1. The CPU 61 makes "YES" determination at the step 705, and then, proceeds to the step 710 to calculate the control volume Gr for the roll-over preventing control based upon the value of the actual lateral acceleration Gy and the table described in the step 710 and corresponding to the table shown in FIG. 3(b). The upper limit value G2 of the control volume Gr for the roll-over preventing control is a value corresponding to the above-mentioned front-wheel-side upper limit value f2.

Then, the CPU 61 proceeds to a step 715 to set a value of a roll-over preventing control now-executing flag ROLL to "1", and then, moves to a step 795 to temporarily terminate this routine. The roll-over preventing control now-executing flag ROLL indicates that the roll-over preventing control is now being executed when the value thereof is "1", while indicates that the roll-over preventing control is not executed when the value thereof is "0".

In case where the absolute value of the actual lateral acceleration Gy is not more than the positive predetermined value Gyr1 in the judgement at the step 705, which means that the roll-over preventing control is not necessarily executed, the CPU 61 moves to a step 720 to set the value of the control volume Gr for the roll-over preventing control to "0", and then, moves to the next step 725 to set the value of the roll-over preventing control now-executing flag ROLL to "0". Thereafter, the CPU 61 proceeds to the step 795 to temporarily terminate this routine. In this way, the control volume Gr for the roll-over preventing control is set.

Subsequently explained is the calculation of a target slip ratio of each wheel required to determine the braking force that should be exerted on each wheel upon executing only the above-mentioned OS-US restraining control and/or roll-over preventing control (accordingly, the stability control upon turning). The CPU 61 repeatedly executes a routine shown in FIG. 8 once every predetermined period. Accordingly, the CPU 61 starts the process from a step 800 at a predetermined timing, and then proceeds to a step 805 to determine whether the value of the US restraining control now-executing flag UNDER is "1" or not, i.e., whether the US restraining control is now being executed or not.

The explanation is continued supposing that the US restraining control is now being executed and further the roll-over preventing control is now being executed. The CPU 61 makes "YES" determination at the step 805, and then, proceeds to a step 810 to determine whether the value of the roll-over preventing control now-executing flag ROLL is "1" or not, i.e., whether the roll-over preventing control is now being executed or not. Since the roll-over preventing control is now being executed at present, the CPU 61 makes "YES" determination at the step 810, and then, proceeds to a step 815 to calculate the understeer restraining braking force damping factor a based upon the value of the control volume Gr for the roll-over preventing control calculated at the step 710 in FIG. 7.

Then, the CPU 61 proceeds to a step 820 to determine whether the value of the turning direction indicating flag L, that is set at the step 430 or step 435 in FIG. 4, is "1" or not. If the CPU 61 makes "YES" determination at the step 820 (i.e., if the vehicle turns in the counterclockwise direction seen from the top of the vehicle), it moves to a step 825 to set a value obtained by multiplying a coefficient Kf by the control volume Gr for the roll-over preventing control as a target slip ratio Stfr of the front-right wheel FR, set a value obtained by multiplying a value, that is obtained by multiplying the understeer restraining braking force damping factor a by a coefficient Kr, by the control volume Gu for the US restraining control set at the step 620 in FIG. 6 as a target slip ratio Strl as the rear-left wheel RL, and set the target slip ratios of Stfl and Strr of the other wheels to "0". Then, the CPU 61 proceeds to a step 895 to temporarily terminate this routine. This process allows to set the target slip ratio, corresponding to the absolute value of the actual lateral acceleration Gy for causing the yawing moment in the direction opposite to the turning direction, to the front-right wheel FR corresponding to the front wheel at the outer side of the turning direction, and to set the target slip ratio, corresponding to the understeer restraining braking force damping factor α and the absolute value of the lateral acceleration deviation ΔGy for causing the yawing moment in the direction same as the turning direction, to the rear-left wheel RL corresponding to the rear wheel at the inner side of the turning direction, in case where the US restraining control and roll-over preventing control are now being executed and the vehicle turns in the counterclockwise direction seen from the top of the vehicle.

On the other hand, when the turning direction indicating flag L is "0" at the judgement of the step 820, the CPU 61 makes "NO" determination at the step 820, and then, proceeds to a step 830 to set a value obtained by multiplying a coefficient Kf by the control volume Gr for the roll-over preventing control as a target slip ratio Stfl of the front-left wheel FL, set a value obtained by multiplying a value, that is obtained by multiplying the understeer restraining braking force damping factor a by a coefficient Kr, by the control volume Gu for the US restraining control as a target slip ratio Strr as the rear-right wheel RR, and set the target slip ratios of Stfr and Strl of the other wheels to "0". Then, the CPU 61 proceeds to the step 895 to temporarily terminate this routine. This process allows to set the target slip ratio, corresponding to the absolute value of the actual lateral acceleration Gy for causing the yawing moment in the direction opposite to the turning direction, to the front-left wheel FL corresponding to the front wheel at the outer side of the turning direction, and to set the target slip ratio, corresponding to the understeer restraining braking force damping factor a and the absolute value of the lateral acceleration deviation ΔGy for causing the yawing moment in the direction same as the turning direction, to the rear-right wheel RR corresponding to the rear wheel at the inner side of the turning direction, in case where the US restraining control and roll-over preventing control are now being executed and the vehicle turns in the clockwise direction seen from the top of the vehicle.

The explanation is continued supposing that the US restraining control is now being executed and further the roll-over preventing control is not executed. The CPU 61 makes "NO" determination at the step 810, and then, proceeds to a step 835 and the following steps for calculating the target slip ratio of each wheel upon executing only the US restraining control.

Each processing at the steps 835 to 845 corresponds to each processing at the steps 820 to 830. When the CPU 61 moves to the step 840 (i.e., when the vehicle is turning in the counterclockwise direction seen from the top of the vehicle), it sets a value obtained by multiplying together the coefficient Kr and the control volume Gu for the US restraining control as the target slip ratio Strl of the rear-left wheel RL as well as set all the target slip ratios Stfl, Stfr and Strr of the other wheels FL, FR and RR to "0". Then, the CPU 61 proceeds to the step 895 to temporarily terminate this routine. This process allows to set the target slip ratio, corresponding to the absolute value of the lateral acceleration deviation ΔGy for causing the yawing moment in the direction same as the turning direction, to only the rear-left wheel RL corresponding to the outside rear wheel in the turning direction in case where only the US restraining control is executed and the vehicle turns in the counterclockwise direction seen from the top of the vehicle.

When the CPU 61 moves to the step 845 (i.e., when the vehicle is turning in the clockwise direction seen from the top of the vehicle), it sets a value obtained by multiplying together the coefficient Kr and the control volume Gu for the US restraining control as the target slip ratio Strr of the rear-right wheel RR as well as set all the target slip ratios Stfl, Stfr and Strl of the other wheels FL, FR and RL to "0". Then, the CPU 61 proceeds to the step 895 to temporarily terminate this routine. This process allows to set the target slip ratio, corresponding to the absolute value of the lateral acceleration deviation ΔGy for causing the yawing moment in the direction same as the turning direction, to only the rear-right wheel RR corresponding to the rear wheel at the inner side of the turning direction in case where only the US restraining control is executed and the vehicle turns in the clockwise direction seen from the top of the vehicle. Subsequently explained is the case where the US restraining control is not executed, i.e., in case where only the OS restraining control is executed, in case where only the roll-over preventing control is executed, in case where OS restraining control and the roll-over preventing control are executed, or in case where any controls are not executed. The CPU 61 makes "NO" determination at the judgement of the step 805, and then, proceeds to a step 850 to set, as control volume Gmax, greater one of the control volume Go for the OS restraining control set at the step 630 or step 635 in FIG. 6 and the control volume Gr for the roll-over preventing control set at the step 710 or step 720 in FIG. 7. Thereafter, the CPU 61 proceeds to a step 855 and the following steps.

Each processing at the steps 855 to 865 corresponds to each processing at the steps 820 to 830. When the CPU 61 moves to the step 860 (i.e., when the vehicle is turning in the counterclockwise direction seen from the top of the vehicle), it sets a value obtained by multiplying together the coefficient Kf and the control volume Gmax as the target slip ratio Stfr of the front-right wheel FR as well as set all the target slip ratios Stfl, Strl and Strr of the other wheels FL, RL and RR to "0". Then, the CPU 61 proceeds to the step 895 to temporarily terminate this routine. This process allows to set the target slip ratio, corresponding to the control volume Gmax for causing the yawing moment in the direction opposite to the turning direction, to only the front-right wheel FR corresponding to the front wheel at the outer side of the turning direction in case where the US restraining control is not executed and the vehicle turns in the counterclockwise direction seen from the top of the vehicle.

Further, when the CPU 61 moves to the step 865 (i.e., when the vehicle is turning in the clockwise direction seen from the top of the vehicle), it sets a value obtained by multiplying together the coefficient Kf and the control volume Gmax as the target slip ratio Stfl of the front-left wheel FL as well as set all the target slip ratios Stfr, Strl and Strr of the other wheels FR, RL and RR to "0". Then, the CPU 61 proceeds to the step 895 to temporarily terminate this routine. This process allows to set the target slip ratio, corresponding to the control volume Gmax for causing the yawing moment in the direction opposite to the turning direction, to only the front-left wheel FL corresponding to the front wheel at the outer side of the turning direction in case where the US restraining control is not executed and the vehicle turns in the clockwise direction seen from the top of the vehicle. In case where no controls are executed, the value of the control volume Go for the OS restraining control and the value of the control volume Gr for the roll-over preventing control are both "0", so that the value of the control volume Gmax is "0", that means the target slip ratios of all wheels are set to "0". As described above, the target slip ratio of each wheel required to determine the braking force that should be exerted on each wheel upon executing only the stability control upon turning is decided.

Subsequently explained is a setting of a control mode of the vehicle. The CPU 61 repeatedly executes a routine shown in FIG. 9 once every predetermined period. Accordingly, the CPU 61 starts the process from a step 900 at a predetermined timing, and then proceeds to a step 905 to determine whether the anti-skid control is necessary or not at the present. The anti-skid control is a control, when a specific wheel is locked with the brake pedal BP operated, for decreasing the braking force of the specific wheel. The detail of the anti-skid control is well-known, so that the detailed explanation thereof is omitted here.

Specifically, at the step 905, the CPU 61 judges that the anti-skid control is necessary in case where the state that the brake pedal BP is operated is shown by the brake switch 55 and the value of the actual slip ratio Sa of the specific wheel calculated at the step 415 in FIG. 4** is not less than the positive predetermined value.

When the anti-skid control is judged to be necessary at the judgement of the step 905, the CPU 61 moves to a step 910 to set "1" to a variable Mode for setting a control mode that simultaneously executes the stability control upon turning and the anti-skid control, and then, proceeds to the following step 950.

On the other hand, when the anti-skid control is judged to be unnecessary at the judgement of the step 905, the CPU 61 moves to a step 915 to determine whether the front-rear braking force distribution control is required or not at present. The front-rear braking force distribution control is a control for decreasing a ratio (distribution) of the braking force of rear wheels to the braking force of front wheels in accordance with a magnitude of a deceleration in the front-rear direction of the vehicle with the brake pedal BP operated. The detail of the front-rear braking force distribution control is well-known, so that the detailed explanation thereof is omitted here.

Specifically, the CPU 61 judges at the step 915 that the front-rear braking force distribution control is needed, in case where the brake switch 55 shows that the brake pedal BP is operated and the case where the estimated body speed DVso calculated at the step 420 of FIG. 4 is a negative value and its absolute value is not less than the predetermined value.

When the front-rear braking force distribution control is needed in the judgement at the step 915, the CPU 61 proceeds to a step 920 where "2" is set to a variable Mode for setting a control mode for executing both the stability control upon turning and the front-rear braking force distribution control. Then, the CPU 61 proceeds to the next step 950.

When the front-rear braking force distribution control is not needed in the judgement at the step 915, the CPU 61 proceeds to a step 925 for determining whether the traction control is needed or not at present. The traction control is a control for increasing the braking force of the specific wheel or decreasing the driving force of the engine 31 in case where the specific wheel is spun in the direction where the driving force of the engine 31 is generated with the brake pedal BP not operated. The detail of the traction control is well-known, so that the detailed explanation thereof is omitted here.

Specifically, the CPU 61 judges at the step 925 that the traction control is needed, in case where the brake switch 55 shows that the brake pedal BP is not operated and the case where the actual slip ratio Sa of the specific wheel calculated at the step 415 of FIG. 4** is a negative value and its absolute value is not less than the predetermined value.

When the traction control is needed in the judgement at the step 925, the CPU 61 proceeds to a step 930 where "3" is set to a variable Mode for setting a control mode that executes both the stability control upon turning and the traction control. Then, the CPU 61 proceeds to the next step 950.

When the traction control is not needed in the judgement at the step 925, the CPU 61 proceeds to a step 935 for determining whether the stability control upon turning is needed or not at present. Specifically, the CPU 61 determines that the stability control upon turning is needed at the step 935 in case where the absolute value of the actual lateral acceleration Gy detected by the lateral acceleration sensor 54 is greater than the value Gyr1 or in case where the absolute value of the lateral acceleration deviation ΔGy calculated at the step 510 in FIG. 5 is greater than the value Gy1 (i.e., in case where at least one of the roll-over preventing control, OS restraining control and the US restraining control is executed), since there exists the specific wheel wherein the value of the target slip ratio St set by the routine in FIG. 8** is not "0".

When the stability control upon turning is needed in the judgement at the step 935, the CPU 61 proceeds to a step 940 where "4" is set to a variable Mode for setting a control mode executing only the stability control upon turning. Then, the CPU 61 proceeds to the next step 950. On the other hand, when it is determined that the stability control upon turning is not needed in the judgement of the step 935, the CPU 61 proceeds to a step 945 where "5" is set to a variable Mode for setting a non-control mode wherein the vehicle motion control is not executed, and then, proceeds to the next step 950. In this case, the specific wheel that should be controlled is not present.

When the CPU 61 proceeds to the step 950, it sets "1" to a flag CONT corresponding to a wheel to be controlled, while sets "0" to a flag CONT corresponding to a wheel not to be controlled, that is not the wheel to be controlled. The wheel to be controlled at this step 950 is a wheel that is required to control at least one of the corresponding pressure increasing valve PU and the pressure decreasing valve PD shown in FIG. 2.

Figure 8:
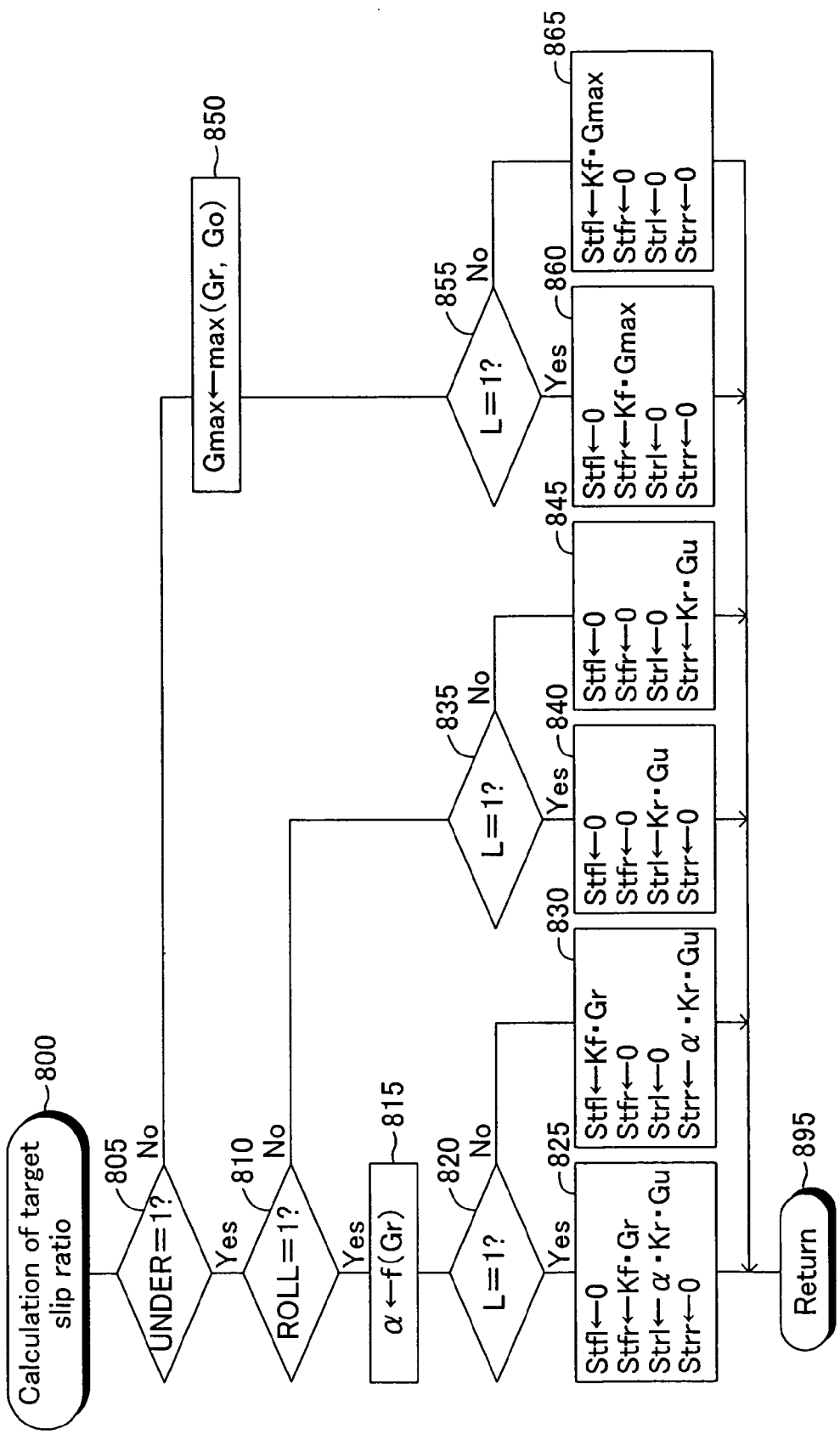
FIG. 8 is a flowchart executed by the CPU shown in FIG. 1 for calculating a target slip ratio upon executing a stability control upon turning.

Accordingly, in case where only the brake fluid pressure in the wheel cylinder Wfr of the front-right wheel FR is required to be increased, such as the case where the brake pedal BP is not operated and the program proceeds to the step 860 in FIG. 8, for example, the control valve SA1, change-over valve STR and pressure increasing valve PUfl shown in FIG. 2 are switched over to the second position and the pressure increasing valve PUfr and the pressure decreasing valve PDfr are respectively controlled, whereby only the brake fluid pressure in the wheel cylinder Wfr is increased by utilizing the high pressure generated from the high-pressure generating section 41 while keeping the brake fluid pressure in the wheel cylinder Wfl to be the fluid pressure at this time. Therefore, not only the front-right wheel FR but also the front-left wheel FL are included in the wheels to be controlled in this case. After executing the step 950, the CPU 61 proceeds to a step 995 for temporarily terminating this routine. As described above, the control mode is specified and the wheel to be controlled is specified.

Figure 10:
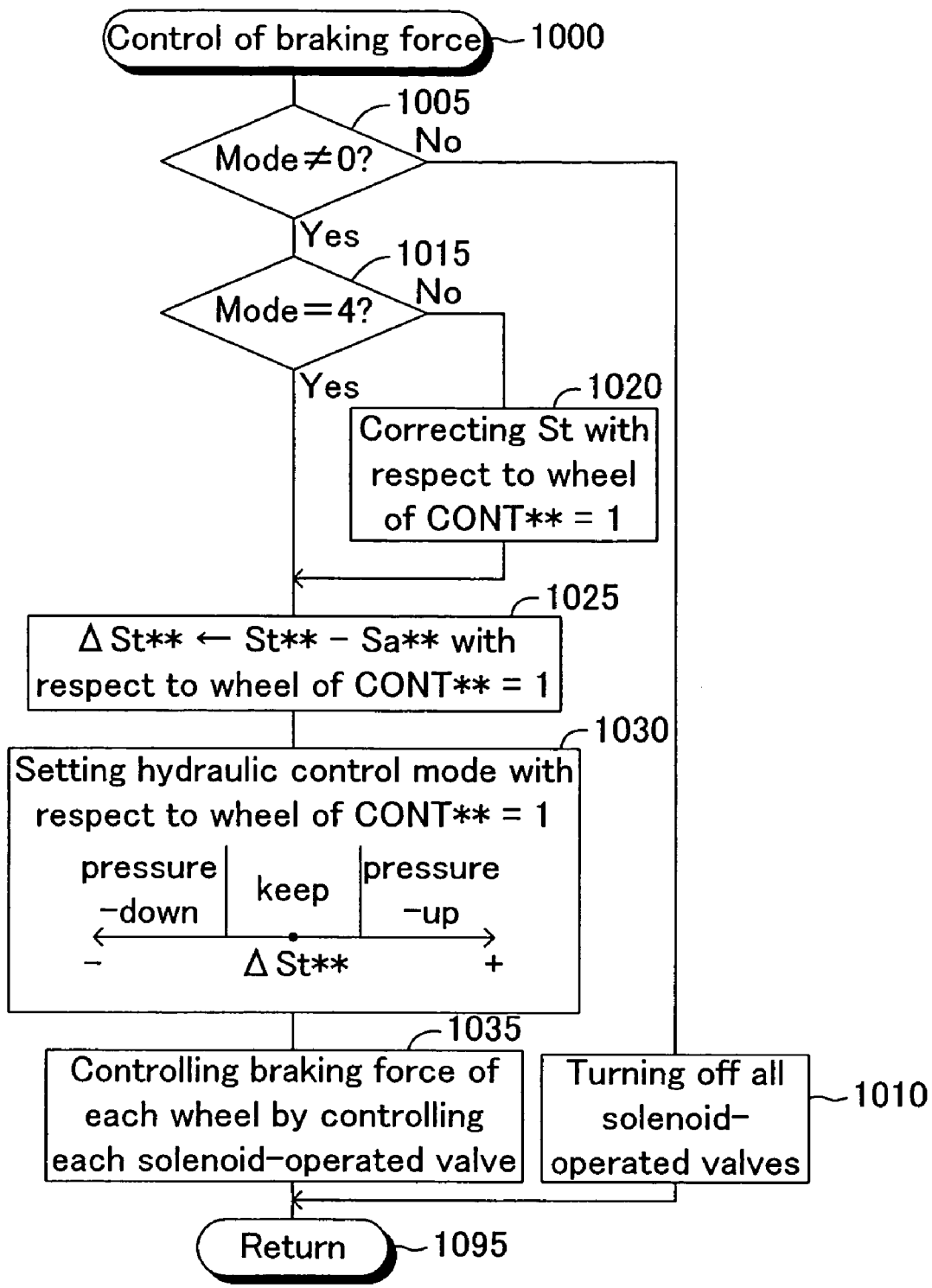
FIG. 10 is a flowchart showing a routine executed by the CPU shown in FIG. 1 for controlling braking force exerted on each wheel.

Subsequently explained is the control of the braking force that should be exerted on each driving wheel. The CPU 61 repeatedly executes the routine shown in FIG. 10 once every predetermined period. Accordingly, the CPU 61 starts the process from a step 1000 at a predetermined timing, and then, proceeds to a step 1005 to determine whether the variable Mode is "0" or not. If the variable Mode is "0" here, the CPU 61 makes "NO" determination at the step 1005, and then, proceeds to a step 1010 for turning off (non-actuated state) all electromagnetic solenoids in the brake hydraulic control device 40 since the brake control is not required to be executed to each wheel. Thereafter, the CPU 61 moves to a step 1095 to temporarily terminate this routine. This allows to supply to each wheel cylinder W** brake fluid pressure according to the operating force of the brake pedal BP by the driver.

On the other hand, if the variable Mode is not "0" in the judgement at the step 1005, the CPU 61 makes "Yes" determination at the step 1005, and proceeds to a step 1015 for determining whether the variable Mode is "4" or not. If the variable Mode is not "4" (i.e., if the anti-skid control or the like that is other than the stability control upon turning is needed), the CPU 61 makes "NO" determination at the step 1015, and then, proceeds to a step 1020 for correcting the target slip ratio St of each wheel that is required upon executing only the stability control upon turning already set in FIG. 8, with respect to the wheel to be controlled wherein the value of the flag CONT is set to "1" at the step 950 in FIG. 9. Then, the CPU 61 moves to a step 1025. By this process, the target slip ratio St of each wheel already set in FIG. 8** is corrected, every wheel to be controlled, by the target slip ratio of each wheel required for executing the control that is simultaneously executed with the stability control upon turning and corresponds to the value of the variable Mode.

If the variable Mode is "4" in the judgement at the step 1015, the CPU 61 makes "YES" determination at the step 1015, and directly moves to the step 1025, since it is unnecessary to correct the target slip ratio St of each wheel already set in FIG. 8. Moving to the step 1025, the CPU 61 calculates a slip ratio deviation Δ St every wheel to be controlled based upon the value of the target slip ratio St, the value of the actual slip ratio Sa calculated at the step 415 in FIG. 4 and the formula disclosed in the step 1025, with respect to the wheel to be controlled wherein the value of the flag CONT is set to "1" at the step 950 in FIG. 9**.

Then, the CPU 61 proceeds to a step 1030 for setting a hydraulic control mode with respect to the wheel to be controlled every wheel to be controlled. Specifically, every wheel to be controlled, the CPU 61 sets the hydraulic control mode to "pressure-up" when the value of the slip ratio deviation Δ St exceeds the predetermined positive reference value, sets the hydraulic control mode to "keep" when the value of the slip ratio deviation Δ St is not less than the predetermined negative reference value but not more than the predetermined positive reference value, and sets the hydraulic control mode to "pressure-down" when the value of the slip ratio deviation Δ St is less than the predetermined negative reference value, based upon the value of the slip ratio deviation Δ St calculated at the step 1025 every wheel to be controlled and the table disclosed in the step 1030.

Subsequently, the CPU 61 proceeds to a step 1035 where it controls the control valves SA1 and SA2 and the change-over valve STR shown in FIG. 2 based upon the hydraulic control mode set at the step 1030 every wheel to be controlled and further it controls the pressure increasing valve PU and pressure reducing valve PD according to the hydraulic control mode every wheel to be controlled.

Specifically, the CPU 61 controls to set the corresponding pressure increasing valve PU and pressure reducing valve PD to the first position (position in the non-actuated state) with respect to the wheel to be controlled having the hydraulic control mode of "pressure-up", while it controls to set the corresponding pressure increasing valve PU to the second position (position in the actuated state) and the corresponding pressure reducing valve PD to the first position with respect to the wheel to be controlled having the hydraulic control mode of "keep", and further it controls to set the corresponding pressure increasing valve PU and pressure reducing valve PD to the second position (position in the actuated state) with respect to the wheel to be controlled having the hydraulic control mode of "pressure-down".

This operation causes to increase the brake fluid pressure in the wheel cylinder W of the wheel to be controlled having the hydraulic control mode of "pressure-up", while to decrease the brake fluid pressure in the wheel cylinder W of the wheel to be controlled having the hydraulic control mode of "pressure-down", whereby each wheel to be controlled is controlled such that the actual slip ratio Sa of each wheel to be controlled approaches to the target slip ratio St. Consequently, the control corresponding to the control mode set in FIG. 9 can be achieved.

Figure 9:
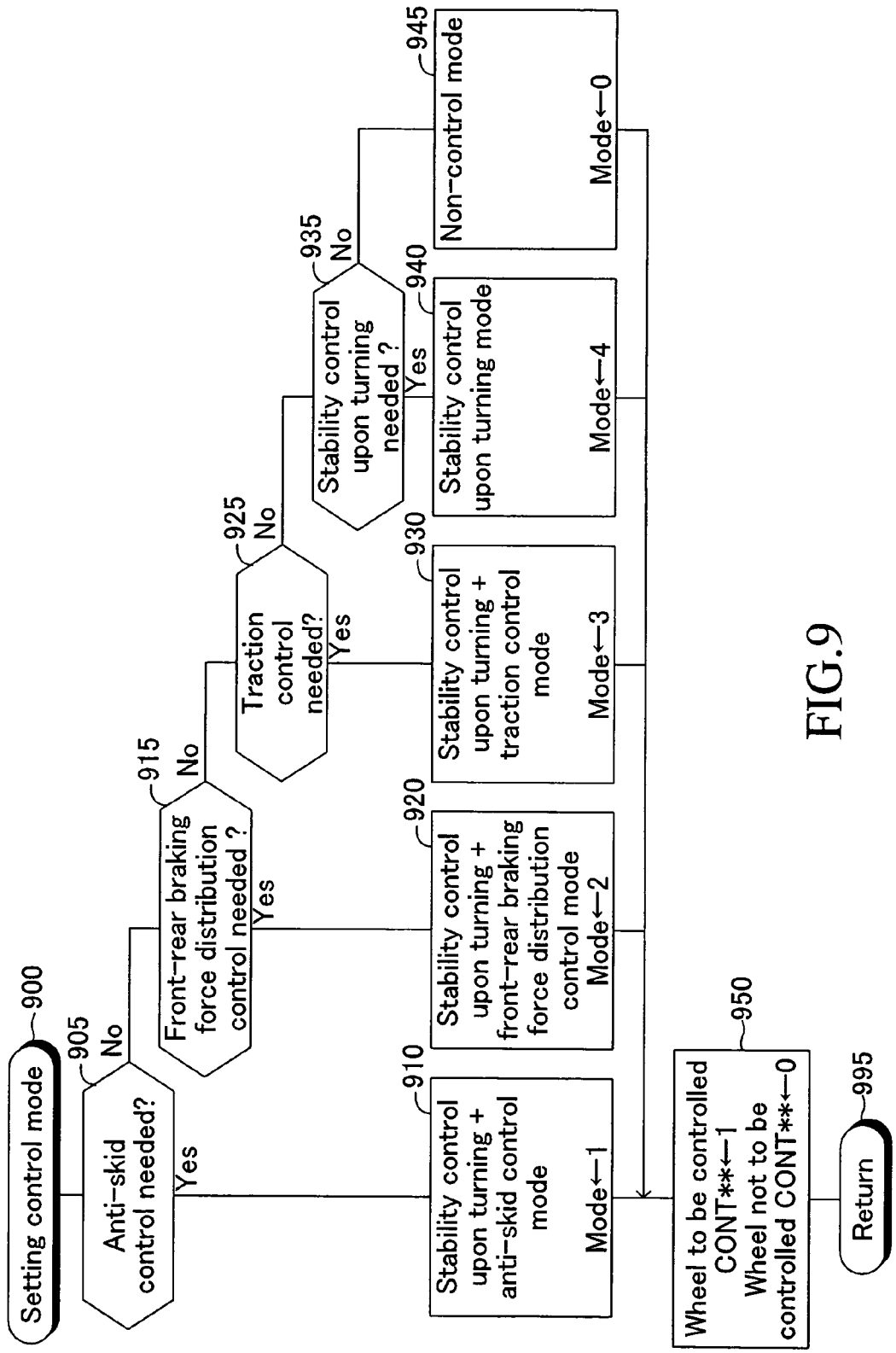
FIG. 9 is a flowchart showing a routine executed by the CPU shown in FIG. 1 for setting a control mode.

It is to be noted that, when the control mode set by the execution of the routine of FIG. 9 is the control mode (variable Mode=3) for executing the traction control mode or the control mode (variable Mode=4) for executing only the stability control upon turning, the CPU 61 controls, according to need, the throttle valve actuator 32 such that the opening of the throttle valve TH becomes smaller than the opening according to the operating amount Accp of the accelerator pedal AP by a predetermined amount for reducing driving force from the engine 31. Then, the CPU 61 proceeds to a step 1095 for temporarily terminating this routine.

Figure 6:
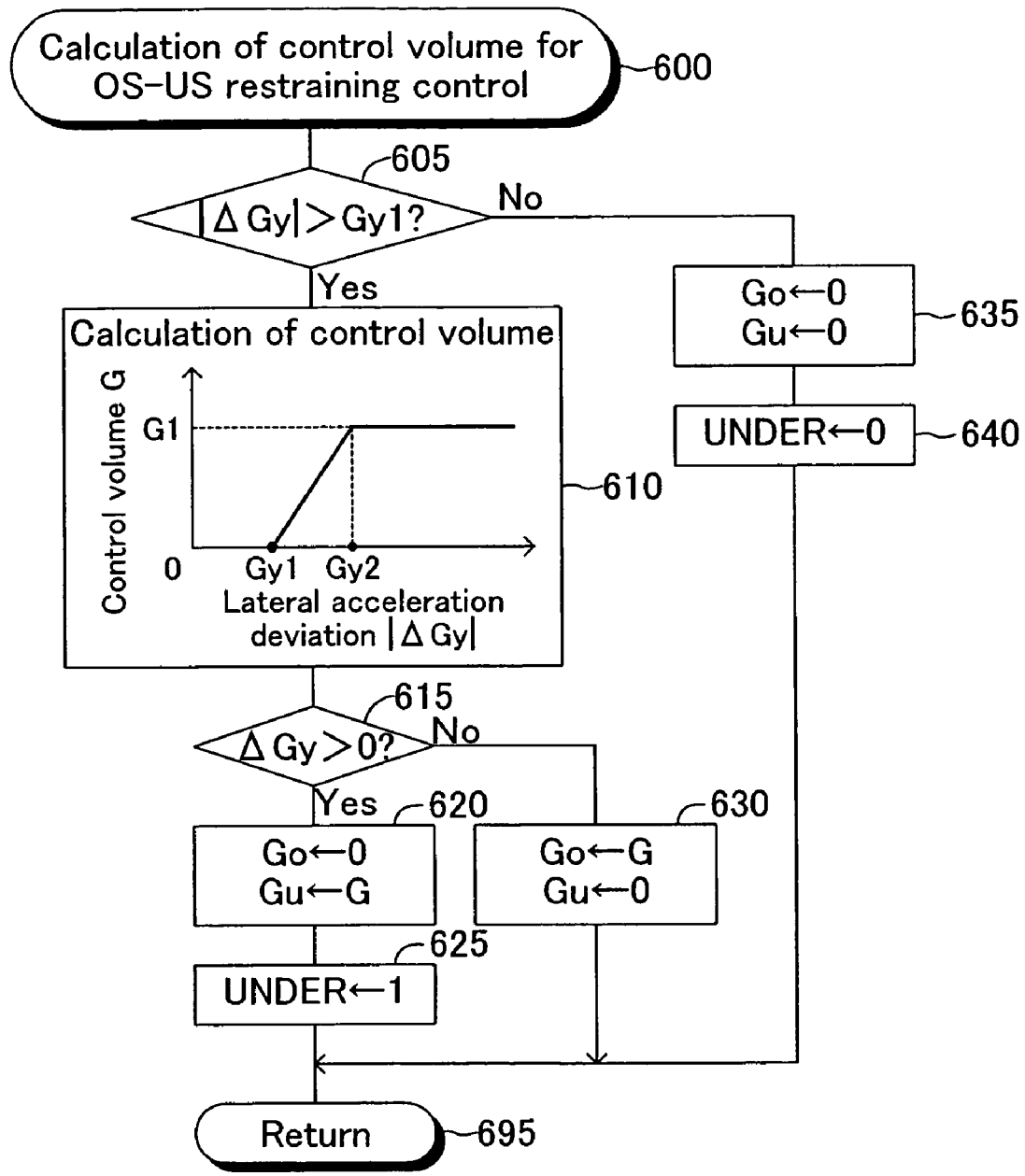
FIG. 6 is a flowchart executed by the CPU shown in FIG. 1 for calculating control volume for an OS-US restraining control.

As explained above, according to the vehicle motion control device of the present invention, the understeer restraining braking force is set based upon the value obtained by multiplying the control volume Gu for the US restraining control, that is a table value obtained by referring to the table described in the step 610 in FIG. 6, by the understeer restraining braking force damping factor $\alpha$ ($0 \leq \alpha \leq 1$), in case where the roll-over preventing control and the understeer restraining control are simultaneously executed. Therefore, the understeer restraining braking force is set so as to be smaller when the lateral acceleration deviation $\Delta$Gy is the same, in case where the roll-over preventing control and the understeer restraining control are simultaneously executed, compared to the case where only the understeer restraining control for setting the understeer restraining braking force based upon the control volume Gr itself for the US restraining control is executed. This allows that priority can be given to the roll-over preventing control over the understeer restraining control, when the roll-over preventing control and the understeer restraining control are simultaneously executed, resulting in preventing that both controls are dissipated, and hence, the turning state of the vehicle is prevented from being unstable.

Further, the understeer restraining braking force damping factor $\alpha$ is set based upon the value of the control volume Gr for the roll-over preventing control (accordingly, the roll-over preventing braking force). Therefore, a degree of giving priority to the roll-over preventing control that can be changed according to the value of the roll-over preventing braking force can always be set to an optimum degree, thereby being capable of more effectively preventing that both controls are dissipated.

The present invention is not limited to the above-mentioned embodiments. Various modifications can be applied within the scope of the present invention. For example, although the slip ratio of each wheel is used as a control target for controlling the braking force exerted on each wheel of the vehicle in the above-mentioned embodiment, any physical quantity such as brake fluid pressure in the wheel cylinder W** of each wheel may be used as a control target, so long as it is physical quantity that changes according to the braking force exerted on each wheel.

Figure 7:
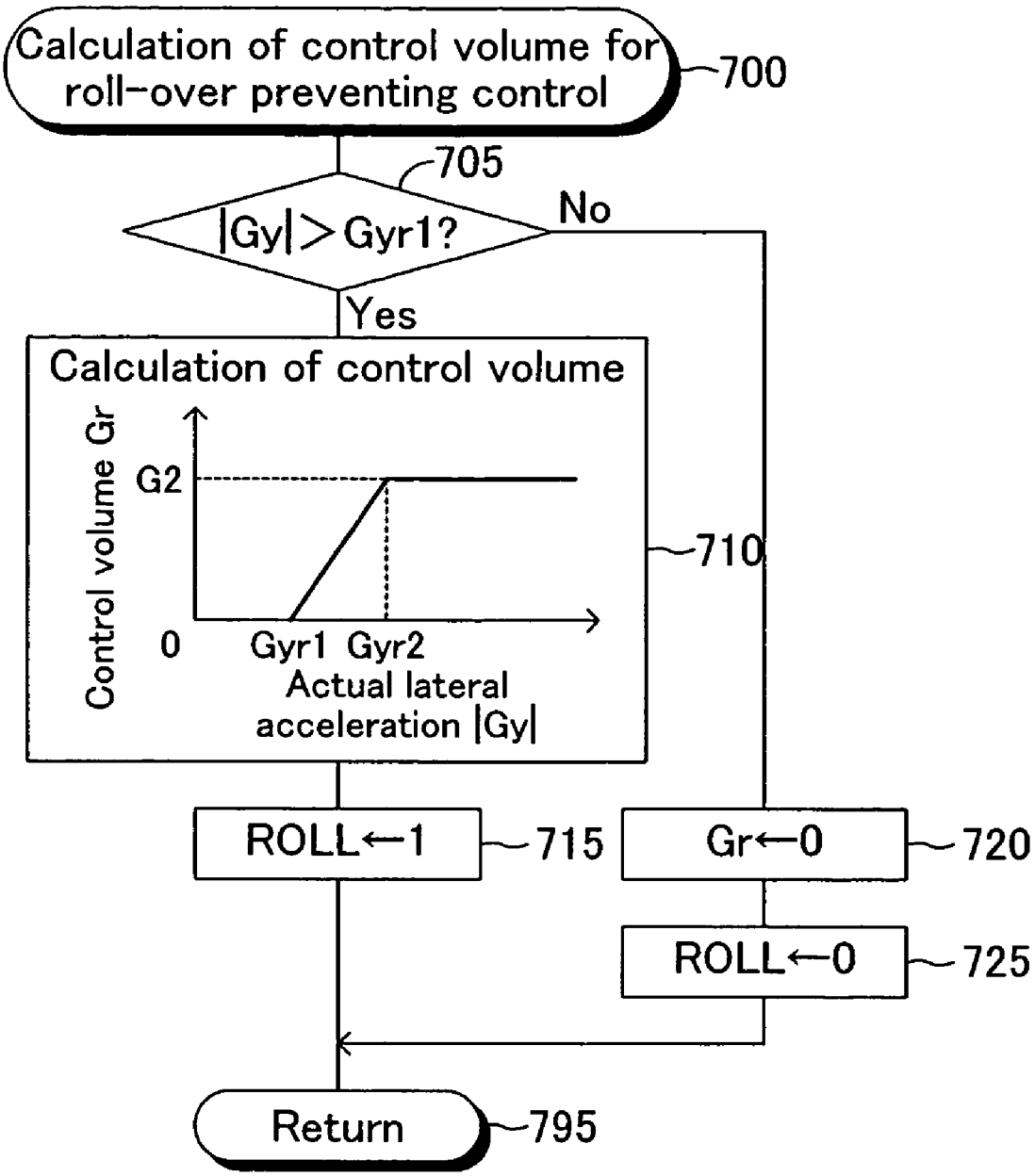
FIG. 7 is a flowchart executed by the CPU shown in FIG. 1 for calculating control volume for the roll-over preventing control.

Moreover, although the maximum value G1 of the control volume G for the OS-US restraining control calculated at the step 610 in FIG. 6 and the maximum value G2 of the control volume Gr for the roll-over preventing control calculated at the step 710 in FIG. 7 are different from each other in the above-mentioned embodiment, the maximum value G1 of the control volume G and the maximum value G2 of the control volume Gr may be the same.

Further, although it is configured in the above-mentioned embodiment that the braking force is exerted on only the rear wheel at the inner side of the turning direction during the US restraining control, it may be configured such that the braking force is exerted on the front and rear wheels at the inner side of the turning direction. Similarly, although it is configured in the above-mentioned embodiment that the braking force is exerted on only the front wheel at the outer side of the turning direction during the roll-over preventing control, it may be configured such that the braking force is exerted on the front and rear wheels at the outer side of the turning direction.

Moreover, in the above-mentioned embodiment, the control volume Gr for the roll-over preventing control during the roll-over preventing control is determined according to the absolute value of the actual lateral acceleration Gy that is indicated by the output value of the lateral acceleration sensor 54 and serves as the excessive roll angle occurrence tendency index value, as shown in the step 710 in FIG. 7. However, the control volume Gr for the roll-over preventing control during the roll-over preventing control may be determined according to an absolute value of a roll angle $\theta$roll caused on the vehicle body and serving as the excessive roll angle occurrence tendency index value. Moreover, the control volume Gr for the roll-over preventing control during the roll-over preventing control may be determined according to the absolute value of a roll angle speed $\theta$'roll by using the roll angle speed $\theta$'roll, that is a time derivative value of the roll angle $\theta$roll, as the excessive roll angle occurrence tendency index value.

Further, it may be configured such that the control volume Gr for the roll-over preventing control is changed according to the absolute value of the actual yaw rate caused on the vehicle body and detected by a yaw rate sensor not shown as the excessive roll angle occurrence tendency index value. Moreover, it may be configured such that the control volume Gr for the roll-over preventing control is changed according to the absolute value of the steering angle $\theta$s (steering operation amount) obtained by the steering angle sensor 52 as the excessive roll angle occurrence tendency index value. Further, it may be configured such that the control volume Gr for the roll-over preventing control is changed according to the absolute value of the revolution speed (operation speed of the steering) of the steering 21 as the excessive roll angle occurrence tendency index value.

Moreover, the "excessive roll angle occurrence tendency index value" may be a total sum of the absolute value of the actual lateral acceleration Gy, absolute value of the yaw rate, absolute value of the roll angle $\theta$roll, roll angle speed $\theta$'roll, steering angle $\theta$s and steering revolution speed $\theta$'s or may be a total sum of the values obtained by multiplying each absolute value by each predetermined coefficient (the weight values). Further, the one of each absolute values that exceeds the reference value corresponding to the predetermined positive value Gyr1 (in case where there are plural values that exceed the corresponding reference value among each absolute value, the one having the greatest degree of deviation from the corresponding reference value) may be adopted as the "excessive roll angle occurrence tendency index value".

What is claimed is:
1. A vehicle motion control device comprising:
   roll angle occurrence tendency index obtaining means for obtaining an excessive roll angle occurrence tendency index value that indicates a degree of tendency that an excessive roll angle occurs on the vehicle; roll-over preventing control means that exerts roll-over preventing braking force, that is for generating a yawing moment on the vehicle in the direction opposite to the turning direction of the vehicle, on a predetermined wheel of the vehicle, when the vehicle is in the turning state and the obtained excessive roll angle occurrence tendency index value exceeds a predetermined value;

understeer tendency index obtaining means for obtaining an understeer tendency index value that indicates a degree of understeer tendency in the turning state of the vehicle; and understeer restraining control means that exerts understeer restraining braking force, that is for generating a yawing moment on the vehicle in the direction same as the turning direction of the vehicle, on a predetermined other wheel of the vehicle, when the obtained understeer tendency index value exceeds a predetermined value;

wherein the roll-over preventing braking force by the roll-over preventing control means and the understeer restraining braking force by the understeer restraining control means can simultaneously be exerted, this device further comprising understeer restraining braking force setting means that sets the understeer restraining braking force such that in a case where the understeer restraining braking force is exerted and the degree of understeer is a certain degree, the understeer restraining braking force is set to become smaller if the roll-over preventing braking force is being simultaneously exerted, but is not set to become smaller if the roll-over preventing braking force is not being simultaneously exerted.

2. A vehicle motion control device claimed in claim 1, wherein the roll-over preventing control means exerts the roll-over preventing braking force on a front wheel at the outer side of the turning direction that is the predetermined wheel.

3. A vehicle motion control device claimed in claim 1, wherein the understeer restraining control means exerts the understeer restraining braking force on a rear wheel at the inner side of the turning direction as the other predetermined wheel.

4. A vehicle motion control device claimed in claim 1, wherein the understeer restraining braking force setting means is configured to change the degree of reducing the understeer restraining braking force according to the value of the roll-over preventing braking force exerted on the predetermined wheel.

5. A vehicle motion control device claimed in claim 4, wherein the understeer restraining braking force setting means is configured to set the understeer restraining braking force such that the understeer restraining braking force decreases as the value of the roll-over preventing braking force increases.

6. A vehicle motion control device claimed in claim 1, wherein the roll angle occurrence tendency index obtaining means is configured to obtain, as the excessive roll angle occurrence tendency index value, a value based upon at least any one of a lateral acceleration that is a component of an acceleration exerted on the vehicle in the side-to-side direction of the vehicle body, a yaw rate exerted on the vehicle, a roll angle caused on the vehicle, a roll angle speed that is a rate of change with time of the roll angle, an operation amount of a steering that changes a turning angle of a steering wheel of the vehicle and an operation speed of the steering.

7. A vehicle motion control device claimed in claim 1, wherein the understeer tendency index obtaining means is provided with:

body speed obtaining means for obtaining a body speed of the vehicle;

steering operation amount obtaining means for obtaining an operation amount of a steering that changes a turning angle of a steering wheel of the vehicle;

actual lateral acceleration related amount obtaining means that obtains, as an actual acceleration related amount, an actual amount of a lateral acceleration related amount showing the degree of the turning of the vehicle; and target lateral acceleration related amount calculating means that calculates, as a target lateral acceleration related amount, a target value of the lateral acceleration related amount according to a predetermined rule defined in advance based upon at least the body speed and the steering operation amount, wherein the understeer tendency index obtaining means is configured to obtain, as the understeer tendency index value, a value based upon the target lateral acceleration related amount and the actual lateral acceleration related amount.

* * * * *